US010623353B2

(12) United States Patent
Yang et al.

(10) Patent No.: US 10,623,353 B2
(45) Date of Patent: Apr. 14, 2020

(54) METHOD AND SYSTEM FOR CONTROLLING MESSAGE DISSEMINATION FROM PUBLIC ACCOUNTS TO USER ACCOUNTS

(71) Applicant: Tencent Technology (Shenzhen) Company Limited, Shenzhen (CN)

(72) Inventors: Maowei Yang, Shenzhen (CN); Jianbo Zou, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 439 days.

(21) Appl. No.: 15/176,023

(22) Filed: Jun. 7, 2016

(65) Prior Publication Data

US 2016/0294748 A1 Oct. 6, 2016

Related U.S. Application Data

(63) Continuation of application No. PCT/CN2014/093875, filed on Dec. 15, 2014.

(30) Foreign Application Priority Data

Dec. 25, 2013 (CN) .......................... 2013 1 0728606

(51) Int. Cl.
*H04L 12/58* (2006.01)
*G06F 16/28* (2019.01)
(Continued)

(52) U.S. Cl.
CPC .......... *H04L 51/066* (2013.01); *G06F 16/285* (2019.01); *G06Q 10/107* (2013.01);
(Continued)

(58) Field of Classification Search
CPC ..... H04L 51/066; H04L 51/32; H04L 67/306; G06F 17/30598; G06Q 10/107;
(Continued)

(56) References Cited

U.S. PATENT DOCUMENTS 6,085,201 A * 7/2000 Tso ........................ G06F 17/277
715/205
7,334,019 B2 * 2/2008 Quick .................. G06Q 10/107
709/206

(Continued)

FOREIGN PATENT DOCUMENTS

CN 101287189 A 10/2008
CN 101562791 A 10/2009
(Continued)

OTHER PUBLICATIONS

Tencent Technology, ISRWO, PCT/CN2014/093875, dated Mar. 23, 2015, 9 pgs.

(Continued)

*Primary Examiner* — Vivek Srivastava
*Assistant Examiner* — Binod J Kunwar
(74) *Attorney, Agent, or Firm* — Morgan, Lewis & Bockius LLP

(57) ABSTRACT

A server with one or more processors and memory receives a template request from a public account in the social networking platform for a message template and determines a category corresponding to the template request based on a characteristic of the public account or a characteristic specified in the template request. The server identifies template(s) according to the category from a template library and sends the template(s) with corresponding template identifiers to the public account. After the sending, the server receives a message request from the public account, including a template identifier for a first message template, recipient infor- (Continued)

mation, and respective values for one or more information parameters of the first message template. The server generates a message based on the message request and the first message template and sends the generated message to a user account in the social networking platform that corresponds to the recipient information.

17 Claims, 17 Drawing Sheets

(51) Int. Cl.
G06Q 50/00 (2012.01)
G06Q 10/10 (2012.01)
H04L 29/08 (2006.01)
H04W 4/12 (2009.01)
H04W 4/18 (2009.01)

(52) U.S. Cl.
CPC ............ G06Q 50/01 (2013.01); H04L 51/32 (2013.01); H04L 67/306 (2013.01); H04W 4/12 (2013.01); H04W 4/18 (2013.01)

(58) Field of Classification Search
CPC .......... G06Q 50/01; H04W 4/12; H04W 4/18; H04M 2215/7492; H04M 3/53375; H04Q 2213/135
USPC .......................................... 709/206; 705/348
See application file for complete search history.

(56) References Cited

U.S. PATENT DOCUMENTS

| | | | | |
|---|---|---|---|---|
| 7,751,533 | B2* | 7/2010 | Makela | G06F 17/243 239/63 |
| 8,676,236 | B1* | 3/2014 | Gautam | H04W 4/14 455/466 |
| 9,331,871 | B2* | 5/2016 | Kapoor | G06Q 30/02 |
| 2002/0178103 | A1* | 11/2002 | Dan | G06Q 40/00 705/37 |
| 2006/0058048 | A1* | 3/2006 | Kapoor | G06Q 30/02 455/466 |
| 2006/0168064 | A1* | 7/2006 | Huynh | G06Q 10/107 709/206 |
| 2006/0265453 | A1* | 11/2006 | Kaminsky | G06Q 10/107 709/206 |
| 2007/0014305 | A1* | 1/2007 | Assad | H04L 67/06 370/447 |
| 2007/0100948 | A1 | 5/2007 | Adams et al. | |
| 2007/0265006 | A1* | 11/2007 | Washok | G06Q 30/02 455/435.1 |
| 2009/0198761 | A1* | 8/2009 | Nanda | G06F 15/16 709/201 |
| 2009/0203359 | A1* | 8/2009 | Makhoul | G06Q 30/02 455/412.2 |
| 2009/0210270 | A1* | 8/2009 | Quan | G06Q 30/02 705/14.67 |
| 2010/0100617 | A1* | 4/2010 | Rossi | H04L 67/24 709/224 |
| 2011/0179122 | A1* | 7/2011 | Clarizio | G06Q 10/107 709/206 |
| 2011/0239160 | A1* | 9/2011 | Kirshenboim | G06Q 10/107 715/810 |
| 2012/0066073 | A1* | 3/2012 | Dilip | G06Q 30/0269 705/14.66 |
| 2012/0124480 | A1 | 5/2012 | Cherdron et al. | |
| 2013/0024524 | A1* | 1/2013 | Graff | G06Q 10/107 709/206 |
| 2013/0086188 | A1* | 4/2013 | Mays | H04L 51/36 709/206 |
| 2013/0097269 | A1* | 4/2013 | Plotkin | H04L 51/02 709/206 |
| 2013/0325969 | A1* | 12/2013 | De | G06Q 30/02 709/206 |
| 2014/0208391 | A1* | 7/2014 | Farnsworth | H04L 51/28 726/4 |
| 2014/0280453 | A1* | 9/2014 | Mattison | H04L 12/1854 709/202 |
| 2015/0019305 | A1* | 1/2015 | Gorawala | G06Q 10/10 705/14.4 |
| 2015/0019662 | A1* | 1/2015 | O'Kane | G06Q 10/107 709/206 |
| 2016/0087925 | A1* | 3/2016 | Kalavagattu | H04L 51/066 709/206 |

FOREIGN PATENT DOCUMENTS

| | | |
|---|---|---|
| CN | 103200156 A | 7/2013 |
| CN | 103458379 A | 12/2013 |
| CN | 104125140 A | 10/2014 |

OTHER PUBLICATIONS

Tencent Technology, IPRP, PCT/CN2014/093875, dated Jun. 28, 2016, 7 pgs.

* cited by examiner

Message Template Library 114

| Message template 502-A | Categories 504-A | Template identifier 506-A |
|---|---|---|
| Message template 502-B | Categories 504-B | Template identifier 506-B |
| ⋮ | ⋮ | ⋮ |
| Message template 502-A | Categories 504-N | Template identifier 506-N |

Figure 5A

Public Accounts Database 116

| Public account name 552-A | Entity name 554-A | Categories 556-A |
|---|---|---|
| Public account name 552-B | Entity name 554-B | Categories 556-B |
| ⋮ | ⋮ | ⋮ |
| Public account name 552-N | Entity name 554-N | Categories 506-N |

Figure 5B

Industry: Culture entertainment/culture|media

| Number | Template name | Primary industry | Secondary industry | The number of users | Whether to select |
|---|---|---|---|---|---|
| 1 | Membership notification | Culture entertainment | Culture\| Media | 3 | √ |
| 2 | Membership expiration reminder | Culture entertainment | Culture\| Media | 0 | |
| 3 | Member recharging notification | Culture entertainment | Culture\| Media | 1 | |
| 4 | Member consumption notification | Culture entertainment | Culture\| Media | 2 | |
| 5 | Subscription success notification | Culture entertainment | Culture\| Media | 3 | |

Don't see a template that you want? Create a new template.

Figure 6B

METHOD AND SYSTEM FOR CONTROLLING MESSAGE DISSEMINATION FROM PUBLIC ACCOUNTS TO USER ACCOUNTS

PRIORITY CLAIM AND RELATED APPLICATIONS

This application is a continuation application of PCT Patent Application No. PCT/CN2014/093875, entitled "METHOD AND SYSTEM FOR CONTROLLING MESSAGE DISSEMINATION FROM PUBLIC ACCOUNTS TO USER ACCOUNTS" filed on Dec. 15, 2014, which claims priority to Chinese Patent Application No. 201310728606.2, entitled "Method for Obtaining Templates, and Method and System for Providing Templates" filed on Dec. 25, 2013, both of which are incorporated by reference in their entirety.

FIELD OF THE TECHNOLOGY

The present disclosure relates to the field of computer data processing technologies, and in particular, to a method and system for controlling message dissemination from public accounts to user accounts.

BACKGROUND

A social networking platform is a novel platform provided by a social communication application, where individual users or enterprise users in the social communication application are able to create their own accounts on the social networking platform so as to enable others users to subscribe to their account or to provide a service.

A public account is a communication account owned by a media entity, an enterprise, or a public figure in the social communication application. For example, bank A has a public account on the social networking platform, and this public account is followed by user accounts (i.e., individual users) on the social communication application. Continuing with this example, the public account may provide a service such as personal bank query, bill notification, and monetary transaction to user accounts subscribed to the public account. However, in this example, in order to avoid unwanted messages (e.g., spam) from public accounts, the public account of bank A is only able to send messages to the user accounts by using a message template. For example, when a user account uses a credit card to complete a payment, the public account of bank A sends a template message to the user account by using a "credit card payment notification" template, where most of content in the template message is fixed, and only content related to a user name, a payment time, a payment amount, a payment matter, and the like is generated in real time.

As such, the foregoing technology at least has the following problem: A message template used by the public account of bank A needs to be registered with the server providing the social networking platform in advance, and the server allows the public account of bank A to use the message template only when the server determines that the message template meets a template specification. There are many public accounts and many templates need to be audited by the server; as a result, the server needs to consume a great number of resources for proper auditing.

SUMMARY

In some embodiments, a method of controlling message dissemination from public accounts to user accounts in a social networking platform is performed at a server (e.g., server system 108, FIGS. 1-2) with one or more processors and memory. The method includes receiving a template request from a public account in the social networking platform for a message template and determining one or more categories corresponding to the template request based on at least one of a characteristic of the public account or a characteristic specified in the template request. The method includes identifying one or more message templates according to the one or more determined categories from a message template library of approved message templates and sending the one or more identified message templates with corresponding template identifiers to the public account. After sending the one or more identified message templates to the public account, the method includes receiving a message request from the public account, where the message request includes a corresponding template identifier of a first message template, recipient information, and respective values for one or more information parameters of the first message template. The method includes generating a message based on the message request and the first message template and sending the generated message to a user account in the social networking platform that corresponds to the recipient information.

In some embodiments, a server (e.g., server system 108, FIGS. 1-2) includes one or more processors and memory storing one or more programs for execution by the one or more processors, the one or more programs include instructions for performing, or controlling performance of, the operations of any of the methods described herein. In some embodiments, a non-transitory computer readable storage medium storing one or more programs, the one or more programs comprising instructions, which, when executed by a server (e.g., server system 108, FIGS. 1-2) with one or more processors, cause the server to perform, or control performance of, the operations of any of the methods described herein. In some embodiments, a server (e.g., server system 108, FIGS. 1-2) includes means for performing, or controlling performance of, the operations of any of the methods described herein.

Various advantages of the present application are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

FIG. 5A is block diagram of a message template library in accordance with some embodiments.

FIG. 5B is block diagram of a public accounts database in accordance with some embodiments.

FIGS. 6A-6B illustrate user interfaces of a template obtaining method in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
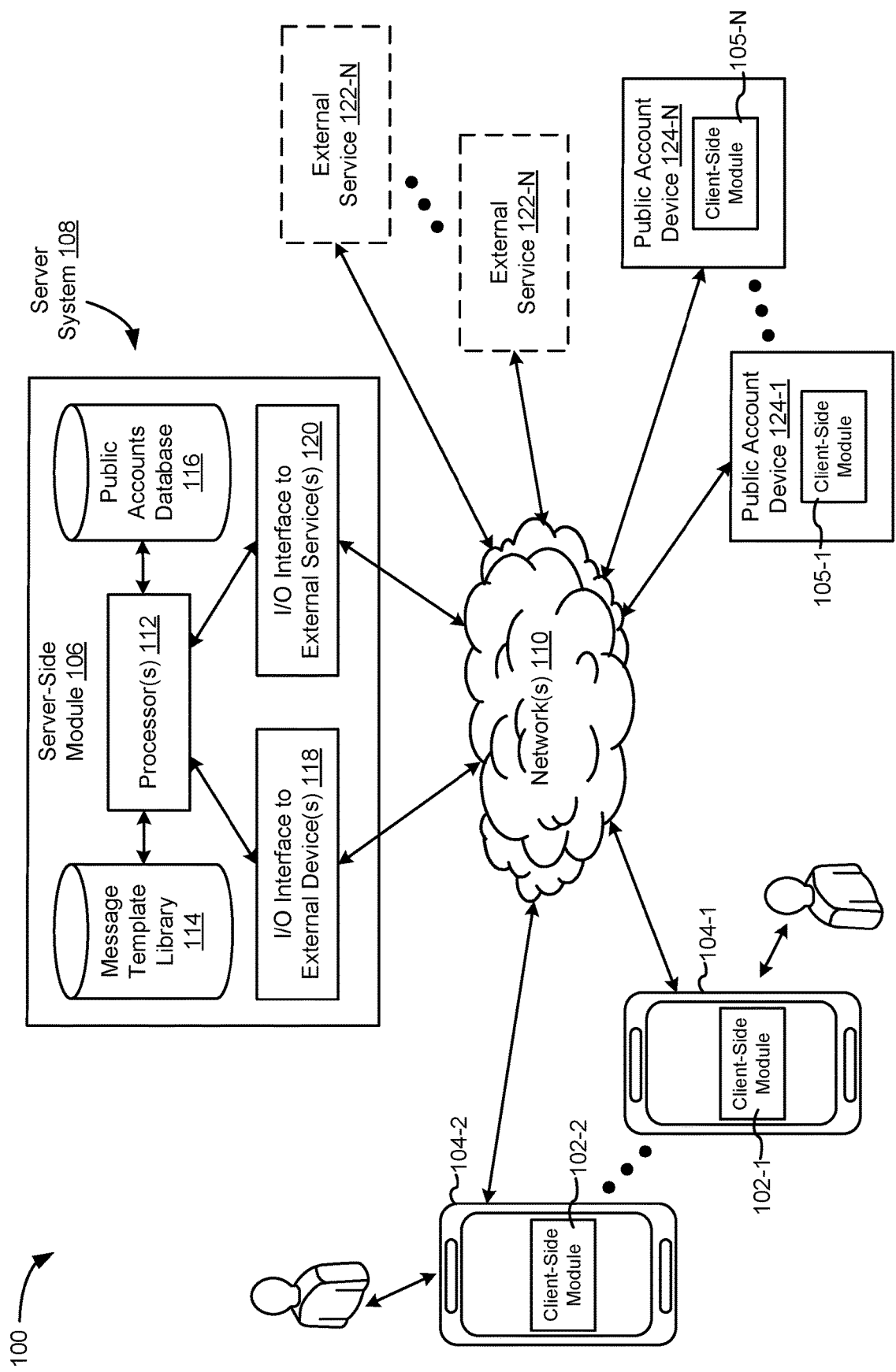
FIG. 1 is a block diagram of a server-client environment in accordance with some embodiments.

As shown in FIG. 1, data processing for a social networking platform or other application is implemented in a server-client environment 100 in accordance with some embodiments. In accordance with some embodiments, server-client environment 100 includes: client-side processing 102-1, 102-2 (hereinafter "client-side modules 102") executed on a client device 104-1, 104-2; client-side processing 105-1, 105-2 (hereinafter "client-side modules 105") executed on a public account device 124-1, 124-2; and server-side processing 106 (hereinafter "server-side module 106") executed on a server system 108. In some embodiments, client-side modules 102 correspond to functionalities performed by individual user accounts, and client-side modules 105 correspond to functionalities performed by public accounts, which are specialized user accounts. The client-side modules 102 are distinct from the client-side modules 105. Client-side modules 102, 105 communicate with server-side module 106 through one or more networks 110. Client-side modules 102, 105 provide client-side functionalities for the social networking platform (e.g., communications, payment processing, user authentication, etc.) to user account and public accounts, respectively, and communications with server-side module 106. Server-side module 106 provides server-side functionalities for the social networking platform (e.g., communications, payment processing, user authentication, etc.) for any number of client modules 102 each residing on a respective client device 104 and any number of client modules 105 each residing on a respective public account device 124.

In some embodiments, server system 108 manages and operates a social networking platform. For example, the social networking platform is an IM (Instant Messenger) application, an SNS (Social Networking Services) application, or the like, or a combination thereof. In some embodiments, client-side module 102 is associated with a user account (sometimes also herein called a "common account") in the social networking platform that corresponds to a user of client device 104. In some embodiments, client-side module 105 is associated with a public account in the social networking platform that corresponds to an entity operating public account device 124. In some embodiments, the public account is a social account that can broadcast information to one or more users in the social networking platform that subscribe to the social account. However, the public account cannot send targeted or private messages to one or more users in the social networking platform unless a message template approved by server system 108 is used. In some embodiments, the public account is a communication account owned by a media entity, an enterprise, or a public figure in the social networking platform. In some embodiments, client-side module 105 is an application client that provides a service or a web page client providing a web page.

For example, a user (i.e., associated with a user account) subscribes to user accounts associated with other users in the social networking platform and/or the user subscribes to public accounts associated with entities in the social networking platform. In this example, the user receives messages and social media posts from user accounts and/or public accounts to which the user is subscribed, and, also, the user is able to send messages and social media posts to user accounts and/or public accounts to which the user is subscribed. In this example, an entity associated with a public account may broadcast social information to one or more user accounts that are subscribed to the public account.

In some embodiments, when the user subscribes to a user account associated with another user in the social networking platform, the other user must allow the user to subscribe to him/her; however, the user is automatically allowed to subscribe to a public account without authorization on behalf of the background server associated with the public account.

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of public account device 124 include, but are not limited to, a server, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

In some embodiments, server-side module 106 includes one or more processors 112, message template library 114, public accounts database 116, an I/O interface to one or more external devices 118, and an I/O interface to one or more external services 120. I/O interface to one or more external devices 118 facilitates the client-facing input and output processing for server-side module 106. One or more processors 112 perform operations for the social networking platform such as routing messages from user accounts to other accounts in the social networking platform or sending targeted messages from public accounts to user accounts based on message templates. Message template library 114 stores approved message templates and corresponding categories (see FIG. 5A and the accompanying for further discussion), and public accounts database 116 stores registered public accounts and one or more corresponding business categories for each registered public account categories (see FIG. 5B and the accompanying for further discussion). I/O interface to one or more external services 120 facilitates communications with one or more external services 122 (e.g., media content hosting services, merchant websites, credit card companies, and/or other payment processing services).

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108.

Server-client environment 100 shown in FIG. 1 includes both a client-side portion (e.g., client-side module 102 and client-side module 105) and a server-side portion (e.g., server-side module 106). In some embodiments, data processing is implemented as a standalone application installed on client device 104 or public account device 124. In addition, the division of functionalities between the client and server portions of client environment data processing can vary in different embodiments. For example, in some embodiments, client-side module 102 and client-side module 105 are thin-clients that provide only user-facing input and output processing functions, and delegate all other data processing functionalities to a backend server (e.g., server system 108).

Figure 2:
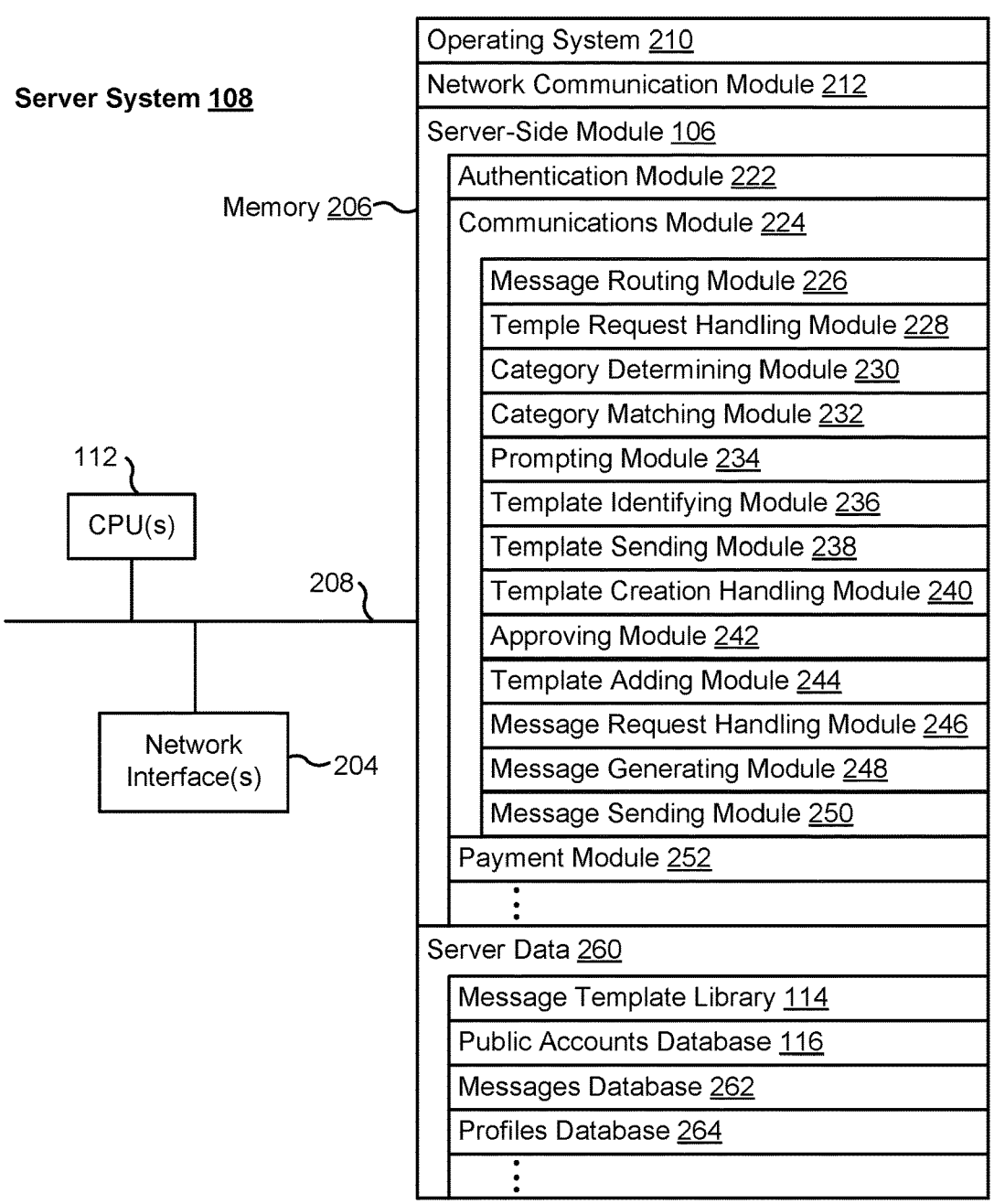
FIG. 2 is a block diagram of a server system in accordance with some embodiments.

FIG. 2 is a block diagram illustrating server system 108 in accordance with some embodiments. Server system 108, typically, includes one or more processing units (CPUs) 112, one or more network interfaces 204 (e.g., including I/O interface to one or more external device(s) 118 and I/O interface to one or more external service(s) 120), memory 206, and one or more communication buses 208 for interconnecting these components (sometimes called a chipset).

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

- operating system 210 including procedures for handling various basic system services and for performing hardware dependent tasks;
- network communication module 212 for connecting server system 108 to other computing devices (e.g., client devices 104, external service(s) 122, and public account device(s) 124) connected to one or more networks 110 via one or more network interfaces 204 (wired or wireless);
- server-side module 106, which provides server-side data processing and functionalities for the social networking platform, including but not limited to:
  - authentication module 222 for authenticating user and public accounts access the social networking platform;
  - communications module 224 for sending messages to users in the social networking platform, including but not limited to:
    - message routing module 226 for routing messages sent by user accounts in the social networking platform to target recipient users in the social networking platform;
    - template request handling module 228 for receiving a template request from a public account in the social networking platform;
    - category determining module 230 for determining one of more categories corresponding to the template request from the public account;
    - category matching module 232 for determining whether a characteristic specified in the template request, which includes one or more template categories, match any template categories in a set of approved template categories corresponding to a first business category under which the public account is registered;
    - prompting module 234 for prompting the public account to initiate a message template creation process in accordance with a determination by category matching module 232 that the one or more template categories specified in the template request do not match any template categories in a set of approved template categories corresponding to a first business category under which the public account is registered;
    - template identifying module 236 for identifying one or more message templates from message template library 114 of approved message templates according to the one or more categories determined by category determining module 230;
    - template sending module 238 for sending the one or more message templates identified by template identifying module 236 to the public account;

template creation handling module 240 for receiving template creation request from a public account in the social networking platform with a new message template or a new message template from a public account in the social networking platform in response to the prompt from prompting module 234;

approving module 242 for determining whether to approve the new message template based on one or more predetermined criteria;

template adding module 244 for: (A) determining a second business category corresponding to the respective template category of the new message and determining whether to add the new message template to message template library 114 and to associate the respective template category of the new message template with a first business category corresponding to the public account, based on a count of shared message templates between the second business category and the first business category, and (B) determining whether to add to the new message template to message template library 114 based on the modification to one of the one or more message templates previously identified by template identifying module 236;

message request handling module 246 for receiving a message request from a public account in the social networking platform, the message request includes a corresponding template identifier of a first message template, recipient information, and respective values for one or more information parameters of the first message template;

message generating module 248 for generating a message based on the message request and the first message template; and message sending module 250 for sending the generated message to a user account in the social networking platform that corresponds to the recipient information;

(optionally) payment module 252 for processing payments associated with transactions initiated by users of client devices 104; and server data 260 storing data, including but not limited to:

message template library 114 storing approved message templates and corresponding categories;

public accounts database 116 storing registered public accounts and one or more corresponding business categories for each registered public account;

messages database 262 storing messages sent by users in the social networking platform; and profiles database 264 storing user profiles for accounts in the social networking platform, where a respective user profile for an account includes a user identifier (e.g., an account name or handle), login credentials to the social networking platform, (optionally) payment data (e.g., linked credit card information, app credit or gift card balance, billing address, shipping address, etc.), an IP address or preferred contact information, contacts list, custom parameters for the user (e.g., age, location, hobbies, etc.), and identified trends and/or likes/dislikes of the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
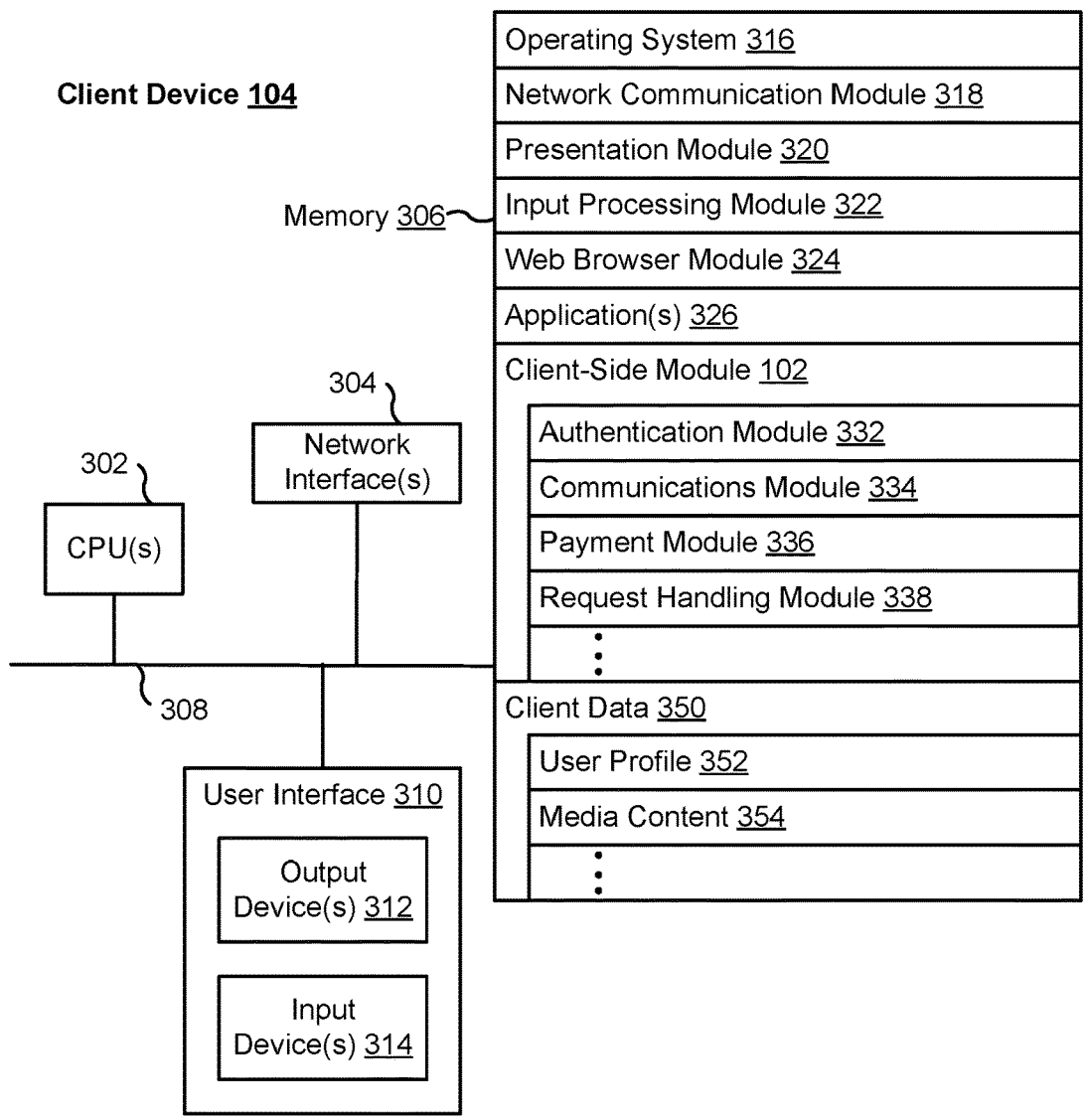
FIG. 3 is a block diagram of a client device in accordance with some embodiments.

FIG. 3 is a block diagram illustrating a representative client device 104 corresponding to a user with a user account in the social networking platform in accordance with some embodiments. Client device 104, typically, includes one or more processing units (CPUs) 302, one or more network interfaces 304, memory 306, and one or more communication buses 308 for interconnecting these components (sometimes called a chipset). Client device 104 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a camera, a gesture capturing camera, or other input buttons or controls. Furthermore, some client devices 104 use a microphone and voice recognition or a camera and gesture recognition to supplement or replace the keyboard. Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

operating system 316 including procedures for handling various basic system services and for performing hardware dependent tasks;

network communication module 318 for connecting client device 104 to other computing devices (e.g., server system 108, external service(s) 122, and public account device(s) 124) connected to one or more networks 110 via one or more network interfaces 304 (wired or wireless);

presentation module 320 for enabling presentation of information (e.g., a user interface for application(s) 326, widgets, websites and web pages thereof, and/or games, audio and/or video content, text, etc.) at client device 104 via one or more output devices 312 (e.g., displays, speakers, etc.) associated with user interface 310;

input processing module 322 for detecting one or more user inputs or interactions from one of the one or more input devices 314 and interpreting the detected input or interaction;

web browser module 324 for navigating, requesting (e.g., via HTTP), and displaying websites and web pages thereof;

one or more applications 326 for execution by client device 104 (e.g., games, application marketplaces, payment platforms, and/or other applications);

client-side module 102, which provides client-side data processing and functionalities for a user account in the social networking platform, including but not limited to:

authentication module 332 for authenticating the user account to access the social networking platform;

communication system 334 for sending messages to and receiving messages from other users in the social networking platform (e.g., instant messaging, group chat, message board, message/news feed, and the like); and (optionally) payment processing 336 for processing payments associated with transactions initiated within the social networking platform or at a merchant's website within web browser module 324; and client data 350 storing data for the user account, including, but is not limited to:

user profile 352 storing a user profile associated with the user account in the social networking platform including a user identifier (e.g., an account name or handle), login credentials to the social networking platform, (optionally) payment data (e.g., linked credit card information, app credit or gift card balance, billing address, shipping address, etc.), an IP address or preferred contact information, contacts list, custom parameters for the user account (e.g., age, location, hobbies, etc.), and identified trends and/or likes/dislikes of the user account; and user data 354 storing data authored, saved, liked, or chosen as favorites in the social networking platform by the user account.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

Figure 4:
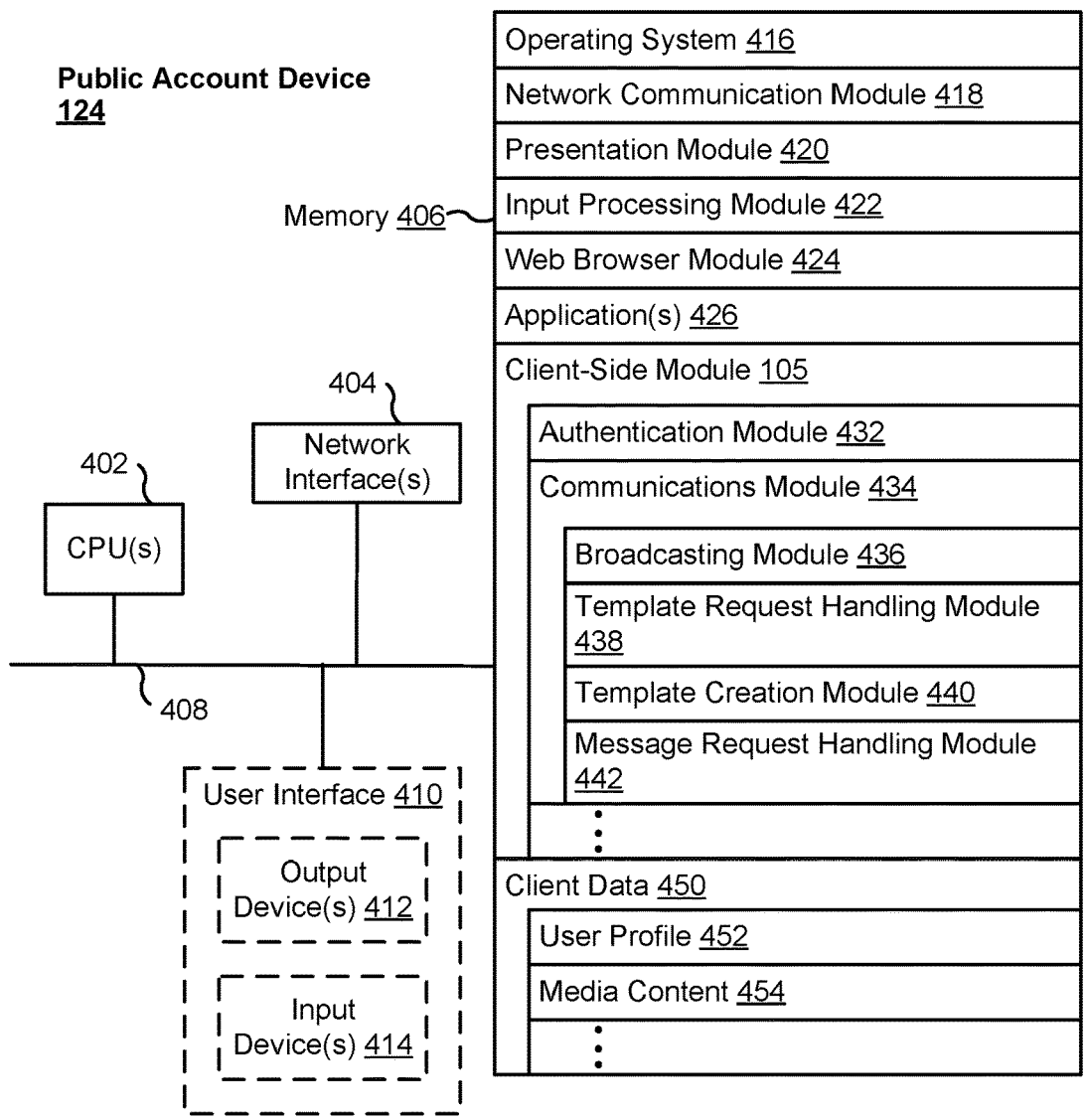
FIG. 4 is a block diagram of a public account device in accordance with some embodiments.

FIG. 4 is a block diagram illustrating a representative public account device 124 corresponding to an entity with a public account in the social networking platform in accordance with some embodiments. Public account device 124, typically, includes one or more processing units (CPUs) 402, one or more network interfaces 404, memory 406, and one or more communication buses 408 for interconnecting these components (sometimes called a chipset). Public account device 124 also optionally includes a user interface 410. User interface 410 includes one or more output devices 412 that enable presentation of media content, including one or more speakers and/or one or more visual displays. User interface 410 also includes one or more input devices 414, including user interface components that facilitate user input such as a keyboard, a mouse, a voice-command input unit or microphone, a touch screen display, a touch-sensitive input pad, a camera, a gesture capturing camera, or other input buttons or controls. Memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 406, optionally, includes one or more storage devices remotely located from one or more processing units 402. Memory 406, or alternatively the non-volatile memory within memory 406, includes a non-transitory computer readable storage medium. In some implementations, memory 406, or the non-transitory computer readable storage medium of memory 406, stores the following programs, modules, and data structures, or a subset or superset thereof:

operating system 416 including procedures for handling various basic system services and for performing hardware dependent tasks;

network communication module 418 for connecting client device 104 to other computing devices (e.g., client device(s) 104, server system 108, and external service(s) 122) connected to one or more networks 110 via one or more network interfaces 404 (wired or wireless);

presentation module 420 for enabling presentation of information (e.g., a user interface for application(s) 426, widgets, websites and web pages thereof, and/or games, audio and/or video content, text, etc.) at client device 104 via one or more output devices 412 (e.g., displays, speakers, etc.) associated with user interface 410;

input processing module 422 for detecting one or more user inputs or interactions from one of the one or more input devices 414 and interpreting the detected input or interaction;

(optionally) web browser module 424 for navigating, requesting (e.g., via HTTP), and displaying websites and web pages thereof;

(optionally) one or more applications 426 for execution by public account device 124 (e.g., games, application marketplaces, payment platforms, and/or other applications);

client-side module 105, which provides client-side data processing and functionalities for a public account in the social networking platform, including but not limited to:

authentication module 432 for authenticating the public account to access the social networking platform;

communication system 434 for sending messages to user accounts in the social networking platform, including but not limited to:

broadcasting module 436 for broadcasting a message to user accounts subscribing to the public account;

template request handling module 438 for sending a template request to server system 108 and for receiving one or more message templates in response to sending the template request;

template creation module 440 for performing a template creation process and sending a template creation request with a new message template to server system 108; and message request handling module 442 for sending a message request to server system 108 including a corresponding template identifier of a first message template, recipient information, and respective values for one or more information parameters of the first message template; and client data 450 storing data for the public account, including, but is not limited to:

user profile 452 storing a user profile associated with the public account in the social networking platform including a user identifier (e.g., an account name or handle), login credentials to the social networking platform, an IP address or preferred contact information, contacts list, custom parameters for the public account (e.g., age, location, hobbies, etc.), and identified trends and/or likes/dislikes of the public account; and user data 454 storing data authored, saved, liked, or chosen as favorites in the social networking platform by the public account.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 406, optionally, stores a subset of the modules and data structures identified above. Furthermore, memory 406, optionally, stores additional modules and data structures not described above.

In some embodiments, at least some of the functions of the client-side module 105 are performed by the server-side module 106, and the corresponding sub-modules of these functions may be located within the server-side module 106 rather than the client-side module 105. In some embodiments, at least some of the functions of the server-side module 106 are performed by the client-side module 105, and the corresponding sub-modules of these functions may be located within the client-side module 105 rather than the server-side module 106. Server system 108 and public account device 124 shown in FIGS. 2 and 4, respectively, are merely illustrative, and different configurations of the modules for implementing the functions described herein are possible in various embodiments.

FIG. 5A is block diagram of a message template library 114 in accordance with some embodiments. In some embodiments, server system 108 manages and operates a social networking platform. In some embodiments, server system 108 maintains message template library 114 with a plurality of entries for approved/audited message templates to be used by public accounts in the social networking platform to send messages to user accounts in the social networking platform.

In FIG. 5A, message template library 114 includes a plurality of message templates 502-A, . . . , 502-N. In FIG. 5A, each message template 502 is associated with one or more categories 504 and a template identifier 506. For example, a "credit card swiping notification" template 502-B is associated with one or more categories 504-B including financial services, point-of-sale systems, credit cards, fraud alert, balance alert, and the like. For example, a respective template identifier 506 is a unique sequence of numbers and/or characters (i.e., a serial number) corresponding to a message template 502.

FIG. 5B is block diagram of public accounts database 116 in accordance with some embodiments. In some embodiments, server system 108 manages and operates a social networking platform. In some embodiments, server system 108 maintains public accounts database 116 with a plurality of entries for registered public accounts in the social networking platform.

In FIG. 5B, public accounts database 116 includes a plurality of public account names 552-A, . . . , 552-N each associated with an account name or handle for a public account registered in the social networking platform. In FIG. 5B, each public account name 552 is associated with an entity name 554 and one or more categories 556. For example, the entry in public accounts database 116 for public account name 552-B includes entity name 554-B of the enterprise, public figure, or media entity who registered public account name 552-B in the social networking platform. Continuing with this example, the entry in public accounts database 116 for public account name 552-B also includes one or more categories 556-B input during registration of public account name 552-B. For example, during registration of a public account in the social networking platform, an entity selects a public account name and also identifies one or more categories corresponding to its services provided, business, or social networking goals (e.g., financial services for a bank, radio and sports for a sports talk radio channel, or fashion and celebrity for a public figure or socialite).

Figure 6A:
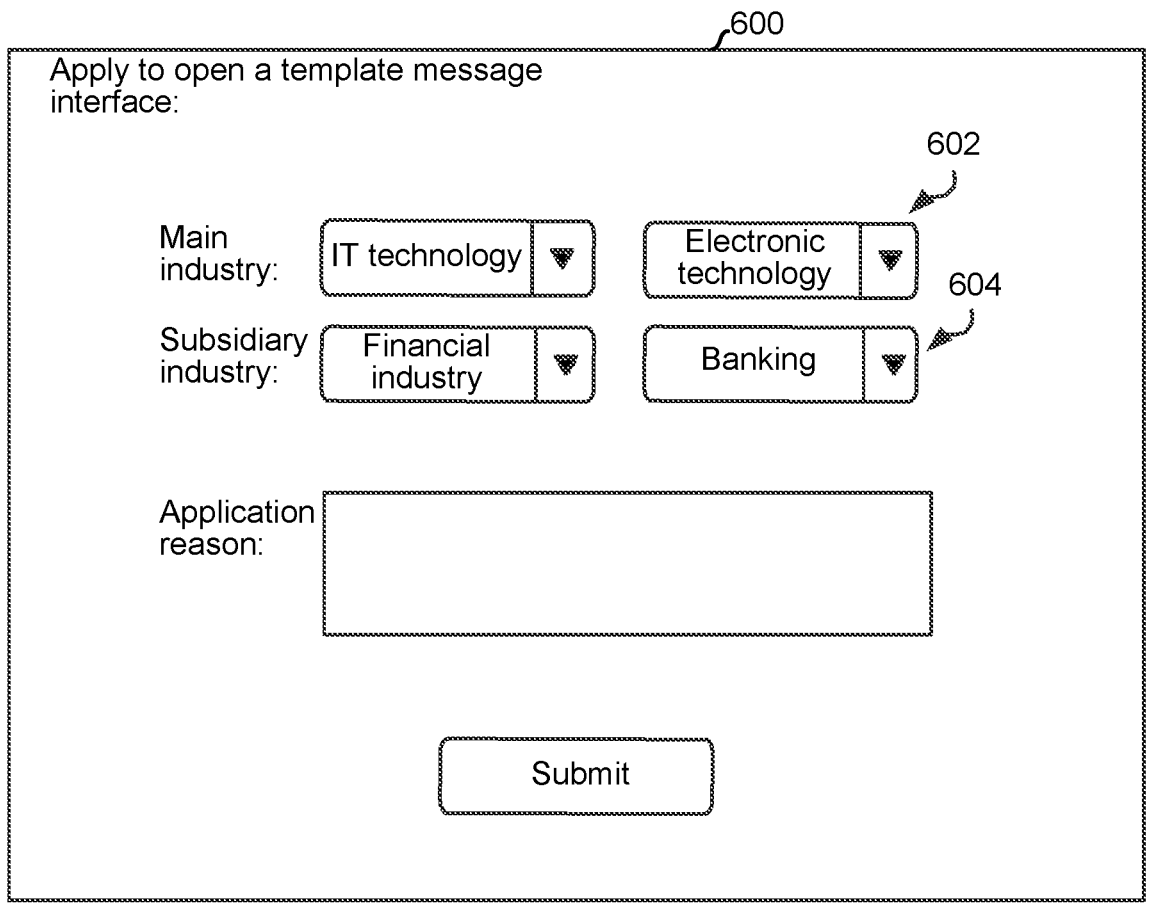

FIGS. 6A-6B illustrate user interfaces for a template obtaining method in accordance with some embodiments. In FIGS. 6A-6B, the user interfaces are displayed by a client-side module 105 executed on a public account device 124 associated with a public account.

FIG. 6A shows a user interface 600 for selecting characteristics (i.e., template categories) for a template request. In FIG. 6A, the public account adds a main industry "IT technology-electronic technology" 602 and a subsidiary industry "financial industry-banking" 604 into the template request.

FIG. 6B shows a user interface 620 for selecting from one or more message templates provided by the server (e.g., server system 108, FIGS. 1-2) in response to sending the template request in FIG. 6A. In FIG. 6B, the one or more message templates displayed on user interface 620 correspond to the characteristics selected by the public account that were included in the template request. In FIG. 6B, the one or more message templates displayed on user interface 620 include "membership notification," "membership expiration reminder," "member recharging notification," "member consumption notification, and "subscription success notification." In FIG. 6B, the user interface 620 also includes affordance 624 (i.e., "Don't see a template that you want? Create a new template."), which the user may select to initiate the template creation process. For example, none of the one or more messages templates may be suitable for the public account's messaging purpose and thus the public account creates a new message template.

For example, the public account clicks on or otherwise interacts with a respective message template of the one or more displayed messages templates in order to select the respective message template, Continuing with this example, in FIG. 6B, when the user intends to select the "membership notification" message template, the user check box 622 corresponding to the "membership notification" message template.

Figure 6C:
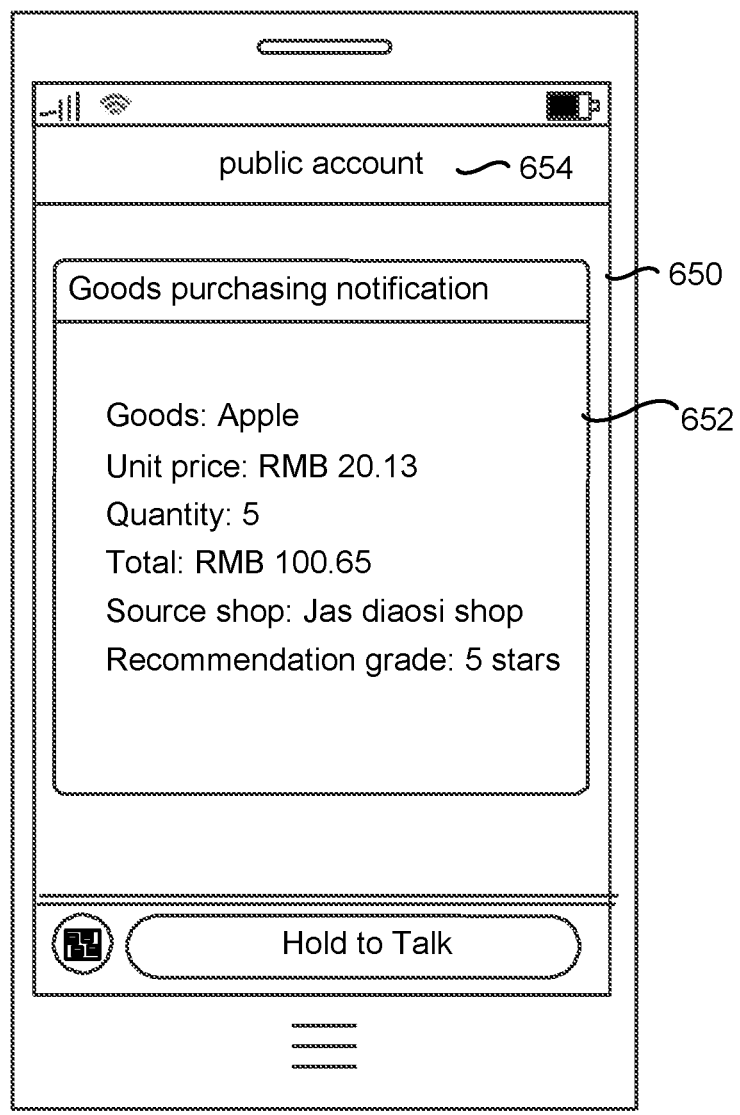
FIG. 6C illustrates a user interface of a message from a public account in accordance with some embodiments.

FIG. 6C illustrates a user interface of a message from a public account a message from a public account in accordance with some embodiments. In FIG. 6C, a user interface 650 is displayed by a client-side module 102 executed on a client device 104 associated with a user account.

In FIG. 6C, a message 652 is displayed on user interface 650. In FIG. 6C, message 652 is a goods purchasing notification from public account 652 that includes the goods purchases, the unit price, quantity of goods purchases, the total purchase price, the source shop for the purchase, and a recommendation grade for the goods.

Figure 7A:
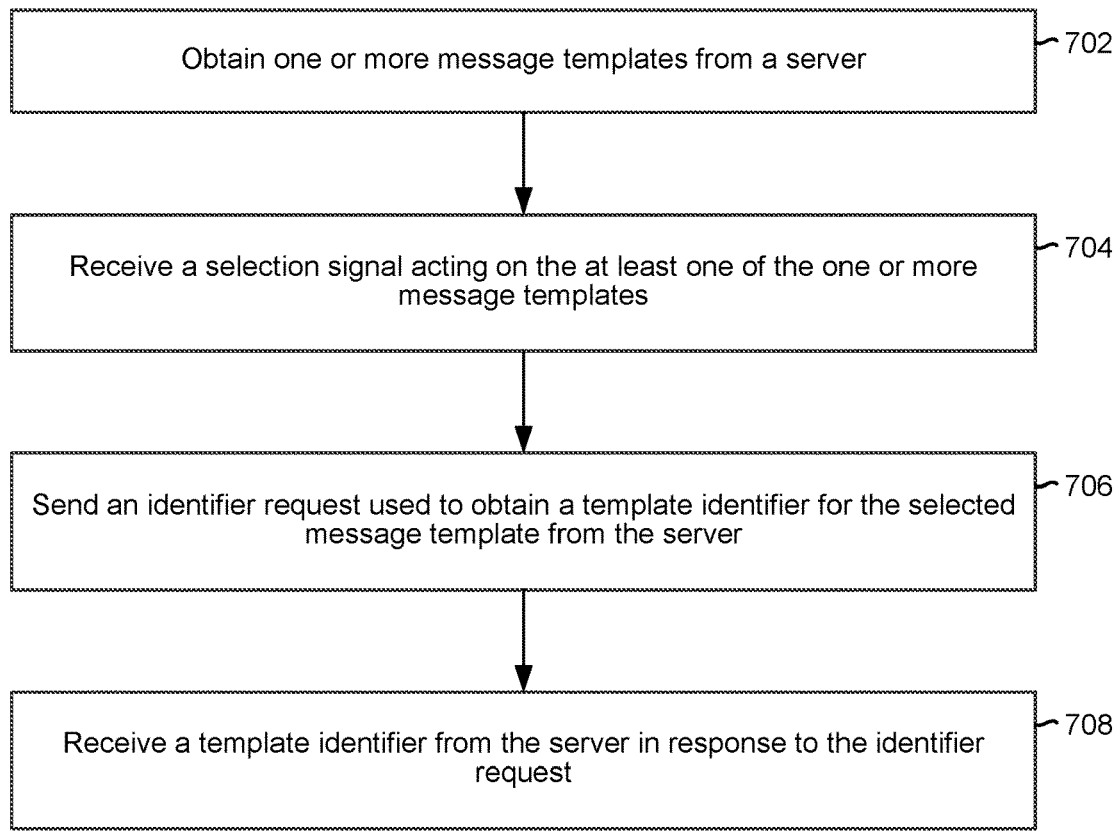
FIG. 7A is a flowchart diagram of a method of obtaining a message template in accordance with some embodiments.

FIG. 7A illustrate a flowchart diagram of a method 700 of obtaining a message template in accordance with some embodiments. In some embodiments, method 700 is performed by a device with one or more processors and memory that is associated with a public account. For example, in some embodiments, method 700 is performed by a public account device 124 (FIGS. 1 and 4) or a component thereof (e.g., communications module 434, FIG. 4). In some embodiments, method 700 is governed by instructions that are stored in a non-transitory computer readable storage medium and the instructions are executed by one or more processors of the device.

In some embodiments, data processing for a social networking platform is implemented in client-server environment 100 (FIG. 1) with a server system 108, one or more client device 104, and one or more public account devices 124. In some embodiments, server system 108 (FIGS. 1-2) manages and operates a social networking platform. For example, the social networking platform is an IM (Instant Messenger) application, an SNS (Social Networking Services) application, or the like, or a combination thereof. In some embodiments, client-side module 102 (FIGS. 1 and 3) is associated with a user account in the social networking platform that corresponds to a user of client device 104 (FIGS. 1 and 3). In some embodiments, client-side module 105 (FIGS. 1 and 4) is associated with a public account in the social networking platform that corresponds to an entity operating public account device 124 (FIGS. 1 and 4).

In general, there are many same or similar message templates that need to be audited by a server (i.e., server system 108 (FIGS. 1-2). For example, a "credit card swiping notification" template is essentially the same as a "credit card transaction notification" template submitted by a public account associated with a bank to be audited. Therefore, the present disclosure provides a mechanism for creating a template library by using audited message templates, for use by a public account. In one aspect, the public account device does not need to repeatedly create a template similar to an existing template, and, in another aspect, the server does not need to consume a great number of resources to audit similar templates.

The public account obtains (702) one or more message templates from a server. In some embodiments, a message template is used by the public account to send a message to one or more user accounts in the social networking platform. For example, the one or more message templates include a "credit card swiping notification" template or a "transaction success notification" template.

The public account receives (704) a selection signal acting on the at least one of the one or more message templates. For example, the public account selects at least one of the one or more message templates obtained from the server to use to send a message to one or more user accounts in the social networking platform.

The public account sends (706) an identifier request used to obtain a template identifier for the selected message template from the server.

The public account receives (708) a template identifier from the server in response to the identifier request. In some embodiments, the template identifier is used to invoke the server to send a message based on the corresponding message template. For example, after receiving the template identifier, the public account stores the template identifier. Continuing with this example, at a time subsequent to the storing, the public account sends a message request to the server with the template identifier, one or more information parameters, and recipient information. In this example, in response to receiving the message request, the server generates a message based on the message template corresponding to the template identifier and the one or more information parameters and sends the generated message to one or more user accounts in the social networking platform that correspond to the recipient information.

To sum up, according to method 700, a public account obtains one or more message templates from a server and obtains a template identifier from the server for a selected message template of the one or more message templates from the server. As such, the server does not need to consume resources to audit messages templates submitted by public account. Also, the public account is able to select a message template without creating and registering the message template itself.

It should be understood that the particular order in which the operations in FIG. 7A have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 750 and 800) are also applicable in an analogous manner to method 700 described above with respect to FIG. 7A.

Figure 7B:
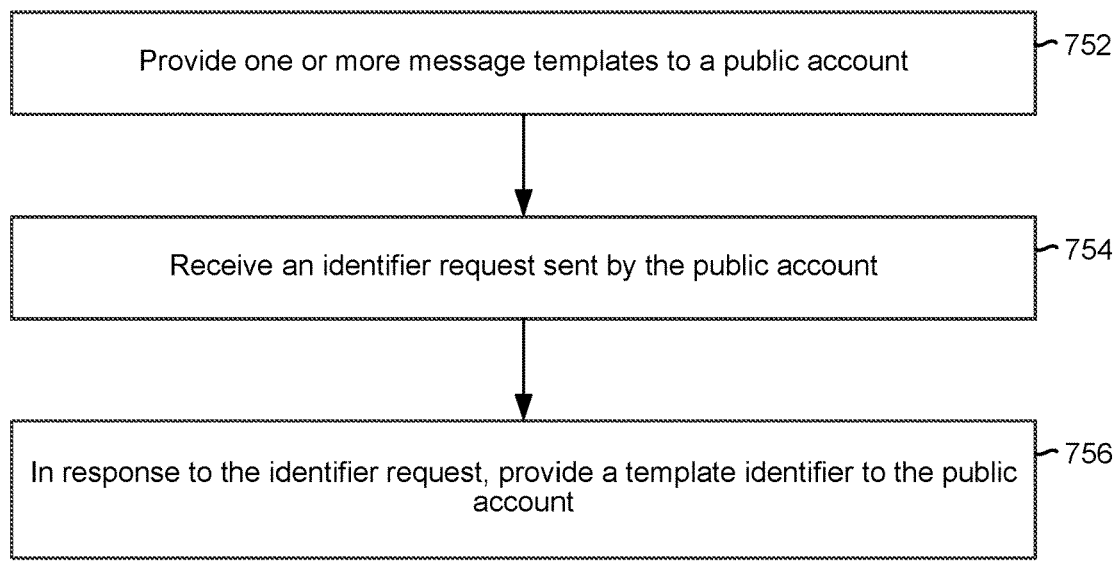
FIG. 7B is a flowchart diagram of a method of providing a message template in accordance with some embodiments.

FIG. 7B illustrate a flowchart diagram of a method 750 of providing a message template in accordance with some embodiments. In some embodiments, method 750 is performed by a server with one or more processors and memory that manages and operations a social networking platform. For example, in some embodiments, method 750 is performed by a server system 108 (FIGS. 1-2) or a component thereof (e.g., communications module 224, FIG. 2). In some embodiments, method 750 is governed by instructions that are stored in a non-transitory computer readable storage medium and the instructions are executed by one or more processors of the server.

In some embodiments, data processing for a social networking platform is implemented in client-server environment 100 (FIG. 1) with a server system 108, one or more client device 104, and one or more public account devices 124. In some embodiments, server system 108 (FIGS. 1-2) manages and operates a social networking platform. For example, the social networking platform is an IM (Instant Messenger) application, an SNS (Social Networking Services) application, or the like, or a combination thereof. In some embodiments, client-side module 102 (FIGS. 1 and 3) is associated with a user account in the social networking platform that corresponds to a user of client device 104 (FIGS. 1 and 3). In some embodiments, client-side module 105 (FIGS. 1 and 4) is associated with a public account in the social networking platform that corresponds to an entity operating public account device 124 (FIGS. 1 and 4).

The server provides (752) one or more message templates to a public account. In some embodiments, a message template is used by the public account to send a message to one or more user accounts in the social networking platform. For example, the one or more message templates include a "credit card swiping notification" template or a "transaction success notification" template.

The server receives (754) an identifier request sent by the public account. In some embodiments, the identifier request is a request sent by the public account to the server after the public account selects at least one of the one or more message templates so as to obtain a template identifier for the at least one selected template.

In response to the identifier request, the server provides (752) a template identifier to the public account. In some embodiments, the template identifier is used to invoke the server to send a message based on the corresponding message template.

To sum up, according to method 750, a public account obtains one or more message templates from a server and obtains a template identifier from the server for a selected message template of the one or more message templates from the server. As such, the server does not need to consume resources to audit messages templates submitted by public account. Also, the public account is able to select a message template without creating and registering the message template itself.

It should be understood that the particular order in which the operations in FIG. 7B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 800) are also applicable in an analogous manner to method 750 described above with respect to FIG. 7B.

Figure 8A:
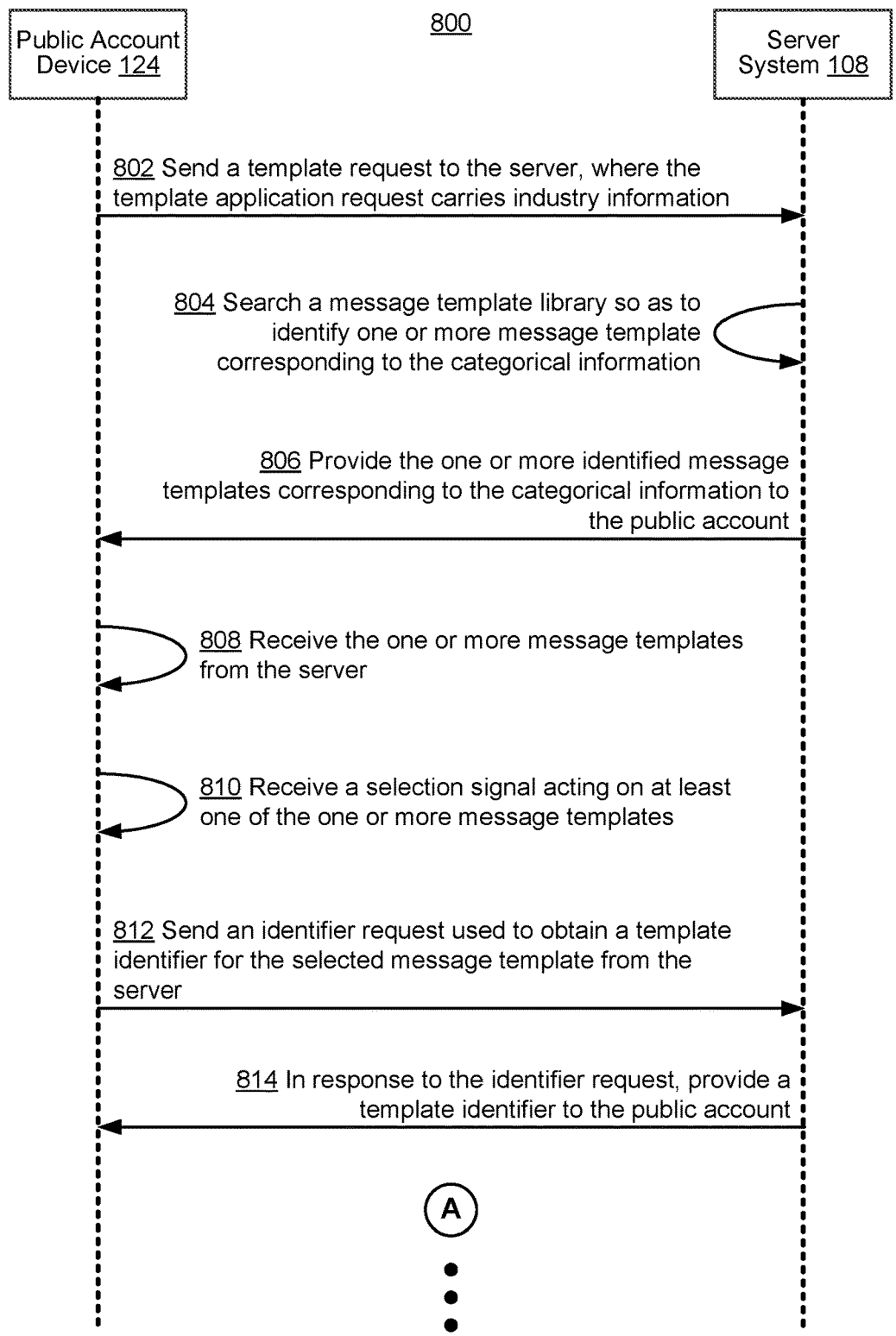
FIGS. 8A-8B illustrate a flow diagram of a process for providing and obtaining a message template in accordance with some embodiments.
Figure 8B:
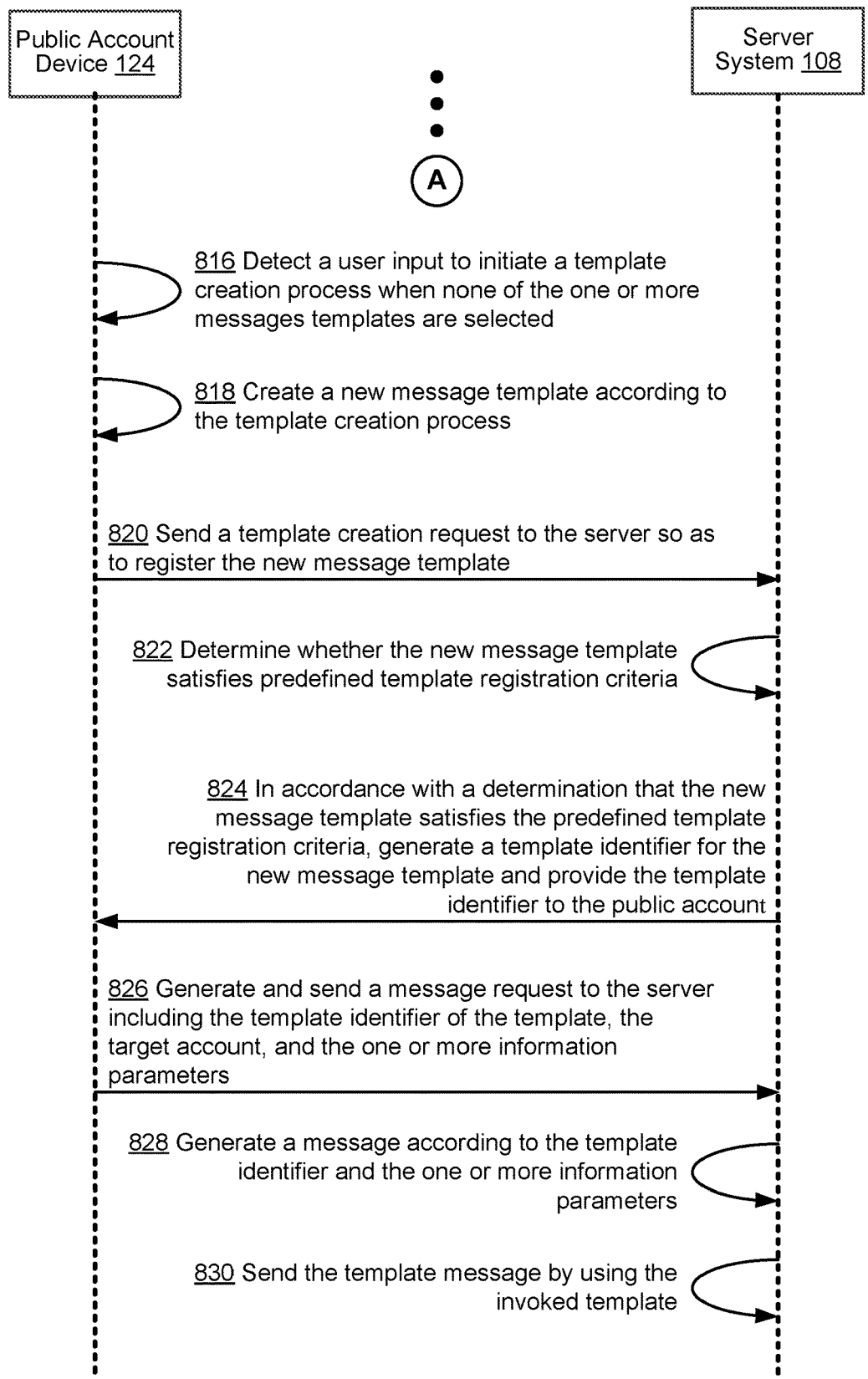
Figure 9A:
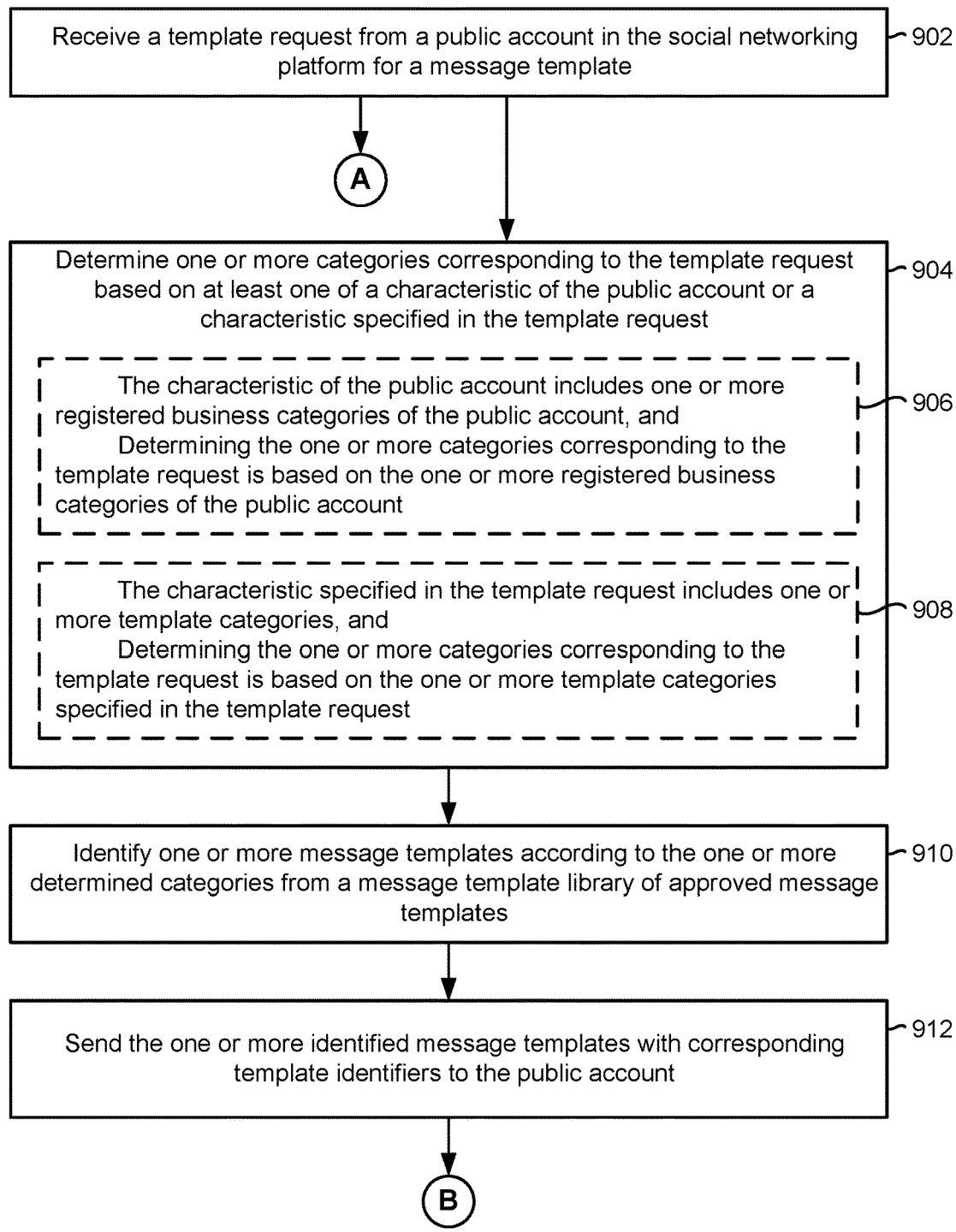
FIGS. 9A-9D illustrate a flowchart diagram of a method of controlling message dissemination from public accounts to user accounts in a social networking platform in accordance with some embodiments.
Figure 9B:
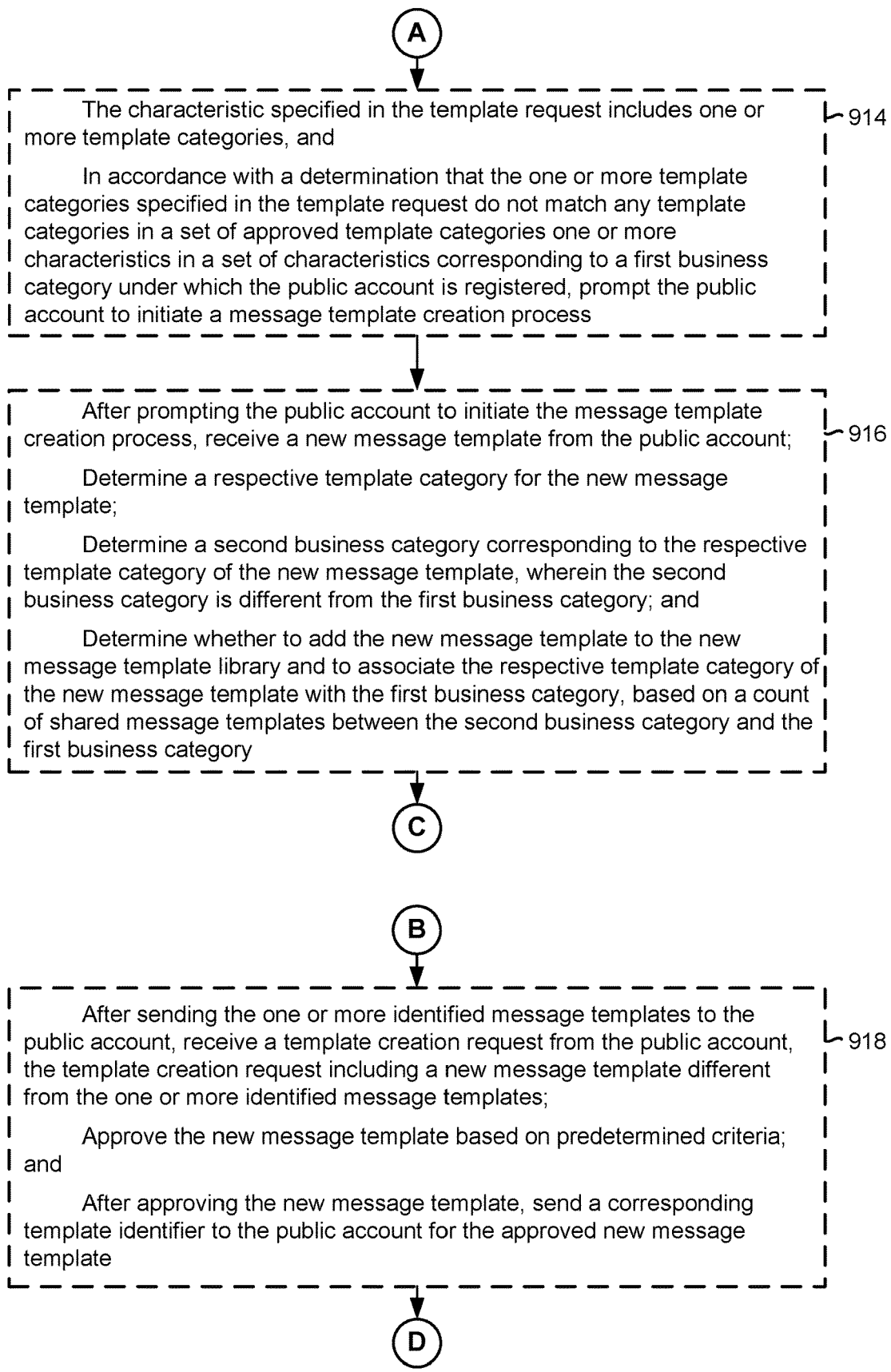
Figure 9C:
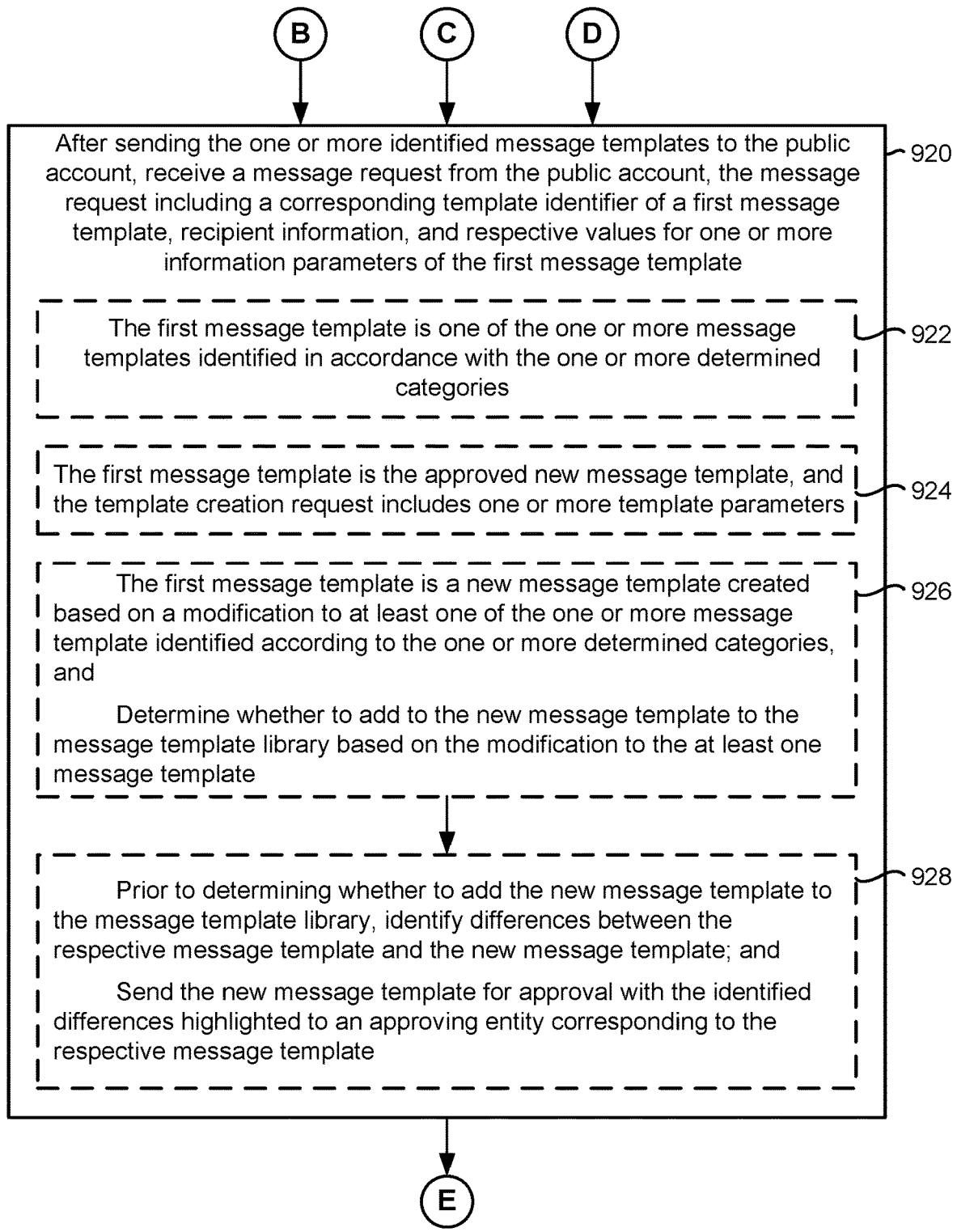
Figure 9D:
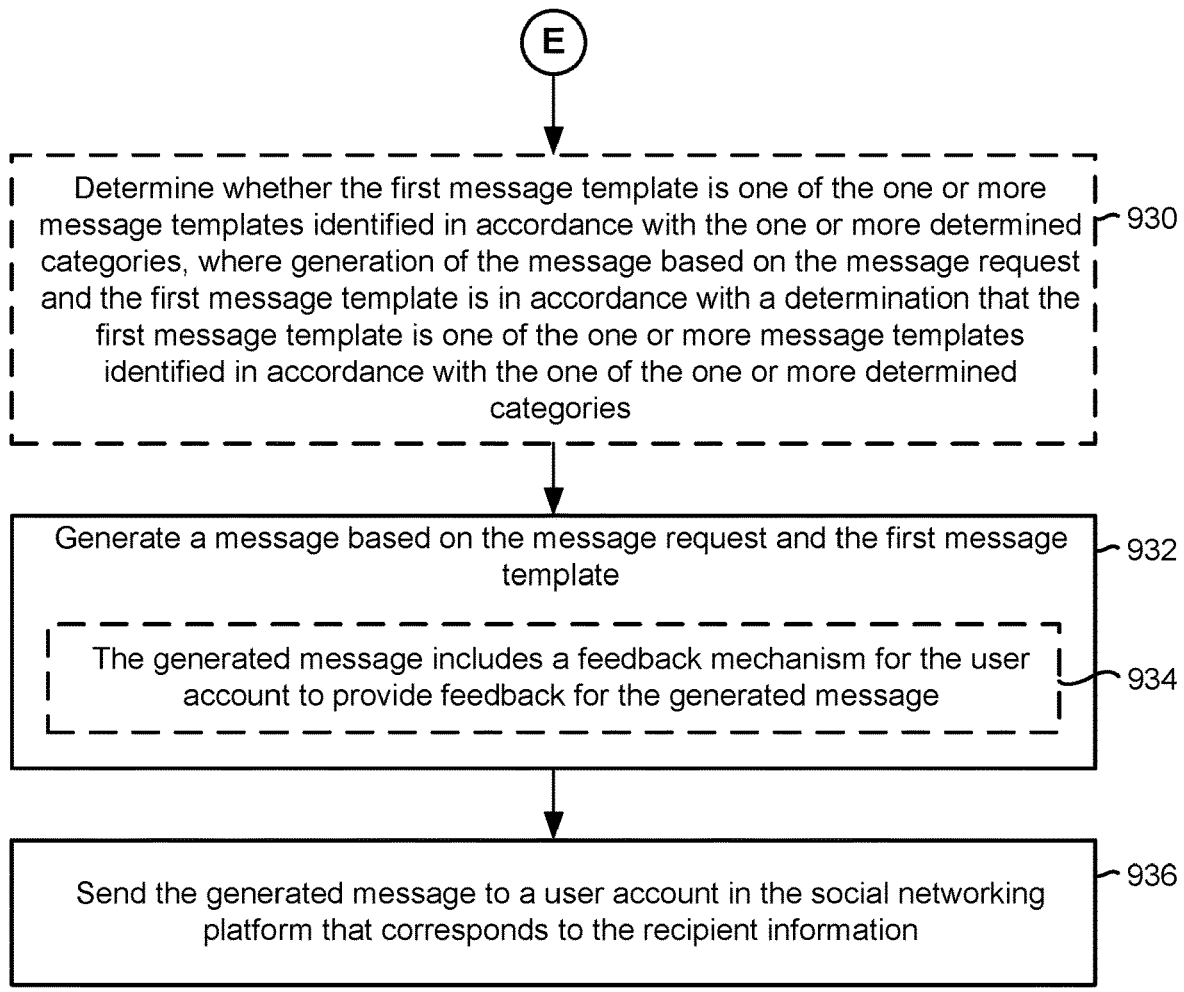

FIGS. 8A-8B illustrate a flow diagram of a process 800 for obtaining a message template in accordance with some embodiments. In some embodiments, method 800 is performed at least in part by a server with one or more processors and memory that manages and operations a social networking platform and at least in part by a device with one or more processors and memory that is associated with a public account. For example, in some embodiments, method 800 is performed at least in part by a server system 108 (FIGS. 1-2) or a component thereof (e.g., communications module 224, FIG. 2) and at least in part by a public account device 124 (FIGS. 1 and 4) or a component thereof (e.g., communications module 434, FIG. 4).

In some embodiments, data processing for a social networking platform is implemented in client-server environment 100 (FIG. 1) with a server system 108, one or more client device 104, and one or more public account devices 124. In some embodiments, server system 108 (FIGS. 1-2) manages and operates a social networking platform. For example, the social networking platform is an IM (Instant Messenger) application, an SNS (Social Networking Services) application, or the like, or a combination thereof. In some embodiments, client-side module 102 (FIGS. 1 and 3) is associated with a user account in the social networking platform that corresponds to a user of client device 104 (FIGS. 1 and 3). In some embodiments, client-side module 105 (FIGS. 1 and 4) is associated with a public account in the social networking platform that corresponds to an entity operating public account device 124 (FIGS. 1 and 4).

The public account sends (802) a template request to the server, where the template application request includes categorical information. In some embodiments, the public account is related to one or more industries. For example, the public account is associated with a bank which is related to financial services, mortgages, loans, currency exchange, and the like. In some embodiments, the categorical information identifies at least industry related to the public account. In another example, the public account is associated with an electronics enterprise. Continuing with this example, when generating the template request, the public account adds a main industry "IT technology-electronic technology" 602 and a subsidiary industry "financial industry-banking" 604 into the template request, as shown in FIG. 6A.

After receiving the template request, the server searches (804) a message template library so as to identify one or more message templates corresponding to the categorical information. For example, the message template library (e.g., message template library 114, FIGS. 1-2 and 5A) includes previously approved/audited message templates classified according to category (i.e., industry). For example, if the categorical information indicates "IT technology-electronic technology" for the public account, the server searches the message template library for all message templates that are associated with "IT technology" and/or "electronic technology." In another example, if the categorical information indicates "financial industry-banking," the server searches the message template library for all message templates that are associated with "financial industry" and/or "banking."

The server provides (806) the one or more identified message templates corresponding to the categorical information to the public account. For example, if the categorical information includes "recreational and sports entertainment/culture/media" and the server finds five message templates: "membership notification," "membership expiration reminder," "member recharging notification," "member consumption notification," and "subscription success notification" matching the categorical information, the server provides these five messages templates to the public account.

The public account receives (808) the one or more message templates from the server. In some embodiments, after receiving the one or more message templates, the public account displays the one or more message templates corresponding to categorical information in the template request. In FIG. 6B, for example, the one or more message templates received by the public account, including "membership notification," "membership expiration reminder," "member recharging notification," "member consumption notification, and "subscription success notification," are displayed.

The public account receives (810) a selection signal acting on at least one of the one or more message templates. In some embodiments, the public account receives a selection signal triggered by a user associated with the public account. For example, the user clicks on or otherwise interacts with at least one of the one or more displayed messages templates. In FIG. 6B, for example, when the user intends to select the "membership notification" message template, the user check box 622 corresponding to the "membership notification" message template.

The public account sends (812) an identifier request used to obtain a template identifier for the selected message template from the server. After the at least one message template is selected, the public account sends the identifier request used to the server in order to obtain a template identifier corresponding to the selected template.

In response to the identifier request, the server provides (814) a template identifier to the public account. In some embodiments, the template identifier is used to invoke the server to send a message based on the corresponding message template.

At this point, after obtaining the template identifier, the public account can use the message template corresponding to the template identifier to send a message to one or more user accounts in the social networking platform.

The public account detects (816) a user input to initiate a template creation process when none of the one or more messages templates are selected. For example, after the public account displays the one or more message templates provided by the server in operation 806, none of the one or more messages templates may be suitable for the public account's messaging purpose. In this case, the public account may create a message template by triggering a template creation process, and the public account detects a user input to initiate the template creation process triggered by the public account. In FIG. 6B, for example, user interface 620 includes affordance 624 (i.e., "Don't see a template that you want? Create a new template."), which the public account may select to initiate the template creation process.

The public account creates (818) a new message template according to the template creation process. In some embodiments, inputs for the template creation process may be made using a peripheral such as a mouse, a keyboard, or a touch screen.

For example, a "goods purchasing notification" template is created, and the template is as follows:
Goods: {{Goods.DATA}}
Unit price: {{Unit_price.DATA}}
Quantity: {{Quantity.DATA}}
Total: {{Total.DATA}}
Source shop: {{Source.Shop.DATA}}
Recommendation grade: {{Source.Recommend.DATA}}

In this example, the "goods," "unit price," "quantity," "total," "source shop," and "recommendation grade" are fixed fields to be filled in with information parameters. That is, the fixed content will not change in all template messages that are generated according to the template. However, in this example, "Goods.DATA," "Unit_price,DATA," "Quantity.DATA," "Total.DATA," "Source.Shop.DATA," and "Source.Recommend.DATA" are information parameters corresponding to the fixed fields which are filled in with particular values be generated in real time when the template message is generated.

The public account sends (820) a template creation request to the server so as to register the new message template.

After receiving the template creation request, the server determines (822) whether the new message template satisfies predefined template registration criteria. In some embodiments, the predefined template registration criteria are determined by the server (i.e., the provider in the social networking platform such as an instant messaging service). For example, the predefined template registration criteria include a format limit for templates, a quantity limit of parameter content for templates, a total length limit for templates, a limit of content that cannot appear in the template, an access limit in the template, and the like.

In accordance with a determination that the new message template satisfies the predefined template registration criteria, the server generates (824) a template identifier for the new message template and provides the template identifier to the public account. In some embodiments, the template identifier is used to invoke the server to send a message based on the corresponding message template. At the same time, the server performs creates an entry in a message template library (e.g., message template library 114, FIGS. 1-2 and 5A) that associates the template and the template identifier. Moreover, the server further associates the entry, including the template and the template identifier, with one or more categories (e.g., according to the categorical information provided by the public account).

In accordance with a determination that the new message template does not satisfy the predefined template registration criteria, the server sends a registration failure notification to the public account.

After receiving the template identifier and detecting a user input to invoke the new message template using template identifier in order to send a message using the new message template, the public account generates and sends (826) a message request to the server including the template identifier of the template, the target account (i.e., one or more recipient user accounts), and the one or more information parameters.

For example, when the public account intends to use a message template in order to send a message using the message template, the public account extracts from personal information data corresponding to the target user account, at least one parameter needed to fill the message template. In view of the requirements of different templates, the information parameters may include at least one of an event time, an event address, an event name, an event type, event content, a link, a message parameter, and the like.

The "goods purchasing notification" template is used as an example, and an example of the obtained information parameters is as follows:
"DATA": {
"Goods": "Apple";
"Unit_price": "RMB 20.13";
"Quantity": "5";
"Total": "RMB 100.65";
"Source": {"Shop": "Jas diaosi shop"; "Recommend": "5 stars"}}

That is, a value of the information parameter "Goods" is "Apple," a value of the information parameter "Unit_price" is "RMB 20.13," a value of the information parameter "Quantity is "5," a value of the information parameter "Total" is "RMB 100.65," a value of the information parameter "Source.Shop" is "Jas diaosi shop," and a value of the information parameter "Source.Recommend" is "5 stars."

After receiving the message request, the server generates (828) a message according to the template identifier and the one or more information parameters. After receiving the sending request of the public account, the server searches the message template library according to identify a message template corresponding to the template identifier. In some embodiments, the message template is a message template selected by the public account from among the one or more message template provided by the server in operation 806 or the new message template registered by the server in operation 822. For example, the public account can invoke a message template as long as the public account has the template identifier corresponding to the message template. In some embodiments, the server fills the message template with the one or more information parameters included in the message request to generate the message.

The server sends (830) the generated message to the target account. In some embodiments, the server forwards the generated message to a user account corresponding to the target account included in the message request.

The "goods purchasing notification" template is used as an example, and the message generated by the server is as follows:
Goods: Apple
Unit price: RMB 20.13
Quantity: 5
Total: RMB 100.65
Source shop: Jas diaosi shop
Recommendation grade: 5 stars In FIG. 6C, for example, the message corresponding to the "goods purchasing notification" template is displayed by the user account corresponding to the target account.

To sum up, according to method 800, a public account obtains one or more message templates from a server and obtains a template identifier from the server for a selected message template of the one or more message templates from the server. As such, the server does not need to consume resources to audit messages templates submitted by public account. Also, the public account is able to select a message template without creating and registering the message template itself.

According to the template obtaining method provided by this embodiment, a message template library is further provided by using the categorical information selected by the public account. In different industries, templates with a same function may be registered, for example, a "transaction success reminder" template is provided by both the electronic retailing industry and the conventional offline retailing industry. Although the templates submitted by the two have a similar function, actual information parameters for the templates vary greatly; therefore, if the message template library is provided by using a function as a category, it is difficult to meet a requirement of all industries; as a result, the audit resources of the server are still wasted to a great extent. However, when the message template library is constructed by using the industry information as a category, functions and specific parameter content of templates needed by industries of a same type are very similar; therefore, a message template provided to the public account according to the industry information has very high repeating utilization, and the audit resources of the server are effectively saved.

It should be understood that the particular order in which the operations in FIGS. 8A-8B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 750) are also applicable in an analogous manner to method 800 described above with respect to FIGS. 8A-8B.

FIGS. 9A-9D illustrate a flowchart diagram of a method 900 of controlling message dissemination from public accounts to user accounts in a social networking platform in accordance with some embodiments. In some embodiments, method 900 is performed by a server with one or more processors and memory. For example, in some embodiments, method 900 is performed by a server system 108 (FIGS. 1-2) or a component thereof (e.g., communications module 224, FIG. 2). In some embodiments, method 900 is governed by instructions that are stored in a non-transitory computer readable storage medium and the instructions are executed by one or more processors of the server. Optional operations are indicated by dashed lines (e.g., boxes with dashed-line borders).

In some embodiments, data processing for a social networking platform is implemented in client-server environment 100 (FIG. 1) with a server system 108, one or more client device 104, and one or more public account devices 124. In some embodiments, server system 108 (FIGS. 1-2) manages and operates a social networking platform. For example, the social networking platform is an IM (Instant Messenger) application, an SNS (Social Networking Services) application, or the like, or a combination thereof. In some embodiments, client-side module 102 (FIGS. 1 and 3) is associated with a user account (sometimes also herein called a "common account") in the social networking platform that corresponds to a user of client device 104 (FIGS. 1 and 3). In some embodiments, client-side module 105 (FIGS. 1 and 4) is associated with a public account in the social networking platform that corresponds to an entity operating public account device 124 (FIGS. 1 and 4).

The server receives (902) a template request from a public account in the social networking platform for a message template. In some embodiments, server system 108 or a component thereof (e.g., template request handling module 228, FIG. 2) receives a template request from a public account in the social networking platform. In some embodiments, the template request includes a characteristic (i.e., one or more template categories).

The server determines (904) one or more categories corresponding to the template request based on at least one of a characteristic of the public account or a characteristic specified in the template request. In some embodiments, server system 108 or a component thereof (e.g., category determining module 230, FIG. 2) determines one of more categories corresponding to the template request from the public account based on a characteristic of the public account and/or a characteristic specified in the template request. In some embodiments, the characteristic of the public account includes one or more categories or industries selected during registration of the public account that are related to the public account's business or provided service (s). For example, during registration, the public account is associated with financial services, mortgages, loans, currency exchange, and the like. In some embodiments, the template request specifies a characteristic (i.e., one or more template categories). In another example, the template request includes an indication for a fashion related template.

In some embodiments, the characteristic of the public account includes (906) one or more registered business categories of the public account, and the server determines the one or more categories corresponding to the template request based on at least one of a characteristic of the public account or a characteristic specified in the template request by determining the one or more categories corresponding to the template request based on the one or more registered business categories of the public account. In some embodiments, during registration of a respective public account, server system 108 or a component thereof creates an entry in public accounts database 116 (FIGS. 1-2 and 5B) for the respective public account including one or more registered business categories (i.e., industries or categories) for the respective public account. In some embodiments, in response to receiving a template request from a respective public account, server system 108 or a component thereof (e.g., category determining module 230, FIG. 2) determines one of more categories corresponding to the template request by searching for an entry in public accounts database 116 that corresponds to the respective public account that sent the template request and identifying the one or more registered business categories corresponding to the respective public account in the entry.

In some embodiments, the characteristic specified in the template request includes (908) one or more template categories, and the server determines one or more categories corresponding to the template request based on at least one of a characteristic of the public account or a characteristic specified in the template request by determining the one or more categories corresponding to the template request based on the one or more template categories specified in the template request. In some embodiments, in response to receiving a template request from a respective public account, server system 108 or a component thereof (e.g., category determining module 230, FIG. 2) determines one of more categories corresponding to the template request according to the one or more template categories specified in the template request.

The server identifies (910) one or more message templates according to the one or more determined categories from a message template library of approved message templates. In some embodiments, server system 108 maintains a message template library 114 that stores approved message templates and corresponding categories. In some embodiments, server system 108 or a component thereof (e.g., template identifying module 236, FIG. 2) identifies one or more message templates from message template library 114 with corresponding categories that match the one or more categories determined by category determining module 230 in one of operations 904-908.

The server sends (912) the one or more identified message templates with corresponding template identifiers to the public account. After template identifying module 236 identifies one or more message templates, server system 108 or a component thereof (e.g., template sending module 238, FIG. 2) sends the one or more identified message templates to the public account.

In some embodiments, the characteristic specified in the template request includes (914) one or more template categories, and, in accordance with a determination that the one or more template categories specified in the template request do not match any template categories in a set of approved template categories corresponding to a first business category under which the public account is registered, the server prompts the public account to initiate a message template creation process. In some embodiments, server system 108 or a component thereof (e.g., category matching module 232, FIG. 2) determines whether a characteristic specified in the template request (i.e., one or more template categories) matches any template categories in a set of approved template categories corresponding to a first business category under which the public account is registered. If category matching module 232 determines that the one or more template categories specified in the template request do not match any template categories in a set of approved template categories corresponding to a first business category under which the public account is registered, server system 108 or a component thereof (e.g., prompting module 234, FIG. 2) prompts the public account to initiate a message template creation process. For example, during registration, the public account is associated with financial services. In this example, the financial services category is associated with a set of frequently used and closely related characteristics such as mortgages, banking, securities, and the like. However, continuing with this example, the template request includes an indication for a fashion related template, which is unrelated to the set of characteristics corresponding to the financial services category. Continuing with this example, in response, server system 108 discards the templates request and prompts the public account to initiate the template creation process. As such, the server system 108 avoids sending messages to user accounts following the public account that are far afield from the categories associated with a public account during registration.

In some embodiments, after prompting the public account to initiate the message template creation process, the server receives (916) a new message template from the public account, and, after receiving the new message template, the server: determines a respective template category for the new message template; determining a second business category corresponding to the respective template category of the new message template, where the second business category is different from the first business category; and determines whether to add the new message template to the new message template library and to associate the respective template category of the new message template with the first business category, based on a count of shared message templates between the second business category and the first business category. In some embodiments, in response to sending the prompt to the public account in operation 914, server system 108 or a component thereof (e.g., template creation handling module 240, FIG. 2) receives a new message template from the public account in the social networking platform. In some embodiments, after receiving the new message template, server system 108 or a component thereof (e.g., template adding module 244, FIG. 2) determines a second business category corresponding to the respective template category of the new message. In some embodiments, template adding module 244 also determines whether to add the new message template to message template library 114 and to associate the respective template category of the new message template with a first business category corresponding to the public account, based on a count of shared message templates between the second business category and the first business category. In some embodiments, template adding module 244 also takes into account a number of votes for the shared message templates before making the association. For example, user accounts in the social networking platform vote on the relatedness of messages via a feedback mechanism. See operation 934 for further discussion of the feedback mechanism.

In some embodiments, after sending the one or more identified message templates to the public account, the server receives (918) a template creation request from the public account. In some embodiments, the template creation request includes a new message template different from the one or more identified message templates. In some embodiments, after receiving the template creation request, the server approves the new message template based on predetermined criteria and, after approving the new message template, sends a corresponding template identifier to the public account for the approved new message template. In some embodiments, after sending the one or more identified message templates to the public account in operation 912, system 108 or a component thereof (e.g., template creation handling module 240, FIG. 2) receives a template creation request from the public account in the social networking platform with a new message template. For example, the public account does not select any of the one or more message templates received from server system 108 as they are not suitable to the public account's messaging goals or intentions. After receiving the template creation request, system 108 or a component thereof (e.g., approving module 242, FIG. 2) determines whether to approve the new message template based on one or more predetermined registration criteria. For example, the one or more predetermined registration criteria include template formatting specifications, template input specifications, and template content specifications that the new message template must satisfy in order to be approved, in this example, server system 108 (i.e., the operator and manager of the social networking platform) determines the one or more predetermined registration criteria in advance so as to protect user accounts from harassing messages from public accounts. After approving the new message template, system 108 or a component thereof generates a template identifier for the new message template, stores the new message template in message template library 114 (FIGS. 1-2 and 5A), and sends the generated template identifier for the new message template to the public account. As such, the public account can invoke the template identifier for the new message template at a time in the future to send a message to one or more user accounts in the social networking platform using the new message template.

After sending the one or more identified message templates to the public account, the server receives (920) a message request from the public account, the message request including a corresponding template identifier of a first message template, recipient information, and respective values for one or more information parameters of the first message template. In some embodiments, server system 108 or a component thereof (e.g., message request handling module 246, FIG. 2) receives a message request from a public account in the social networking platform. In some embodiments, the message request includes a corresponding template identifier of a first message template, recipient information, and respective values for one or more information parameters of the first message template.

In some embodiments, operations 910-912 occur well before the message request is sent to server system 108. However, once the public account knows the template identifier, it can send a message request at any time using the template identifier, and values for the information parameters in the corresponding message template. In some embodiments, the "information parameters" refer to values used to fill in the variables or fields in the message template. In some embodiments, the first message template is one of the one or more message identified message templates in operation 910. In some embodiments, the first message template is the new message template in operations 916 or 918 that was created by the public account.

In some embodiments, the public account is able to broadcast messages to subscribers/followers of the public account in the social networking platform without sending a message request to server system 108. However, in some embodiments, when the public account intends to send a targeted message to a select group of one or more user accounts in the social networking platform, the public account is required to send a message request to server system 108 with a corresponding template identifier for the targeted message.

In some embodiments, the first message template is (922) one of the one or more message templates identified in accordance with the one or more determined categories. In some embodiments, the first message template is one of the one or more message identified message templates in operation 910.

In some embodiments, the first message template is (924) the approved new message template, and where template creation request includes one or more template parameters. In some embodiments, the first message template is the new message template in operations 916 or 918 that was created by the public account. For example, if the public account does not select one of the one or more message identified message templates in operation 910, the public account automatically initiates a message template creation process to create a new message template or server system 108 prompts the public account to initiate the message template creation process to create a new message template.

In some embodiments, the first message template is (926) a new message template created based on a modification to at least one of the one or more message template identified according to the one or more determined categories, and the server determines whether to add to the new message template to the message template library based on the modification to the at least one message template. For example, the public account does not select one of the one or more message identified message templates in operation 910 and, instead, modifies a respective message template of the one of the one or more message identified message templates. In some embodiments, server system 108 or a component thereof (e.g., template adding module 244, FIG. 2) determines whether to add to the new message template to message template library 114 based on the modification to one of the one or more message templates previously identified by template identifying module 236. In some embodiments, sever system 108 also identifies a previous person or group that reviewed/approved the respective message template, and sends the modification to the respective template to the previous group or person that reviewed/approved the respective message template for approval so as to save auditing time.

In some embodiments, prior to determining whether to add the new message template to the message template library, the server identifies (928) differences between the respective message template and the new message template and sends the new message template for approval with the identified differences highlighted to an approving entity corresponding to the respective message template. In some embodiments, server system 108 identifies the differences between the respective message template and the modified new message template further reduces auditing time.

In some embodiments, the server determines (930) whether the first message template is one of the one or more message templates identified in accordance with the one or more determined categories, where generation of the message based on the message request and the first message template is in accordance with a determination that the first message template is one of the one or more message templates identified in accordance with the one of the one or more determined categories. In some embodiments, after receiving the message request, server system 108 determines whether the first message template is one of the one of the one or more message templates identified in accordance with the one of the one or more determined categories in operation 910. In accordance with a determination that the first message template is not one of the one or more identified message templates, server system 108 rejects the message request. In other words, if the public account tries to use a template identifier that does not belong to its business category, the message will not be generated. For example, if the "banking" business category is associated with five message templates, and a public account associated with a bank sends a template request to server system 108, server system 108 provides the five message templates to the public account. Continuing with this example, if the public account sends a message request with a template identifier corresponding to a message template that is not one of the five message templates associated with the "banking" category, server system 108 rejects the message request.

The server generates (932) a message based on the message request and the first message template. In some embodiments, server system 108 or a component thereof (e.g., message generating module 248, FIG. 2) generates a message based on the first message template corresponding to the template identifier in the message request and the respective values included in the message request for one or more information parameters of the first message template.

In some embodiments, the generated message includes (934) a feedback mechanism for the user account to provide feedback for the generated message. In some embodiments, the message generated by message generating module 248 in operation 932 includes a feedback mechanism. For example, the feedback mechanism is used to provide statistics to public accounts and also to remove irrelevant or harassing message templates from message template library 114 (FIGS. 1-2 and 5A).

The server sends (936) the generated message to a user account in the social networking platform that corresponds to the recipient information. After generating the message, in some embodiments, server system 108 or a component thereof (e.g., message sending module 250, FIG. 2) sends the generated message to one or more user accounts in the social networking platform according to the recipient information included in the message request.

It should be understood that the particular order in which the operations in FIGS. 9A-9D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 750 and 800) are also applicable in an analogous manner to method 900 described above with respect to FIGS. 9A-9D.

Figure 10A:
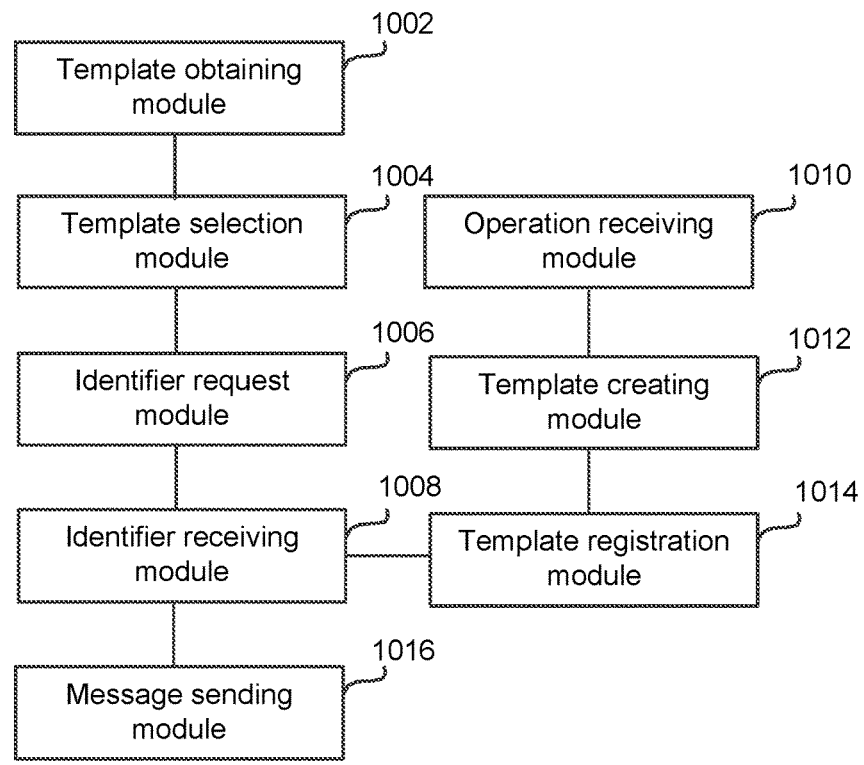
FIG. 10A is a block diagram of a template obtaining apparatus in accordance with some embodiments.

FIG. 10A is a block diagram of a template obtaining apparatus according in accordance with some embodiments. For example, the template obtaining apparatus corresponds to communications module 434 (FIG. 4) of a public account device 124 (FIGS. 1 and 4). In some embodiments, the template providing apparatus may be implemented in whole or in part on a device (e.g., public account device 124, FIGS. 1 and 4) through software, hardware, or a combination thereof. In some embodiments, the template obtaining apparatus includes template obtaining module 1002, template selection module 1004, identifier request module 1006, and identifier receiving module 1008.

In some embodiments, template obtaining module 1002 is configured to obtain one or more message templates from a server (e.g., server system 108, FIGS. 1-2).

In some embodiments, template obtaining module 1002 includes: a request sending unit and a template receiving unit (not shown in FIG. 10A). In some embodiments, the request sending unit is configured to send a template request to the server, where the template application request includes categorical information. In some embodiments, the template receiving unit is configured to receive one or more message templates provided by the server that correspond to the categorical information.

In some embodiments, template selection module 1004 is configured to receive a selection signal acting on the at least one of the one or more message templates.

In some embodiments, identifier request module 1006 is configured to send an identifier request used to obtain a template identifier for the selected message template from the server.

In some embodiments, identifier receiving module 1008 is configured to receive a template identifier from the server in response to the identifier request. In some embodiments, the template identifier is used to invoke the server to send a message based on the corresponding message template.

In some embodiments, the template obtaining apparatus also includes operation receiving module 1010, template creating module 1012, template registration module 1014, and message sending module 1016.

In some embodiments, operation receiving module 1010 is configured to detect a user input to initiate a template creation process when none of the one or more messages templates are selected.

In some embodiments, template creating module 1012 is configured to create a new message template according to the template creation process.

In some embodiments, template registration module 1014 is configured to send a template creation request to the server so as to register the new message template.

In some embodiments, message sending module 1016 is configured to generate and send a message request to the server including the template identifier of the message template, the target account (i.e., one or more recipient user accounts), and the one or more information parameters.

It should be noted that, the template obtaining apparatus provided by the foregoing embodiment is an example of the division of the foregoing functions, and, in an actual application, the foregoing functions may be accomplished by different functional modules as required. That is, the structure of the template obtaining apparatus is divided into different functional modules, so as to accomplish all or a part of the functions in the foregoing description. In addition, the template obtaining apparatus provided by the foregoing embodiment belongs to a same concept as the embodiment of the template obtaining method, and for the specific implementation process, reference may be made to methods 700 and 800, which is not described herein again.

Figure 10B:
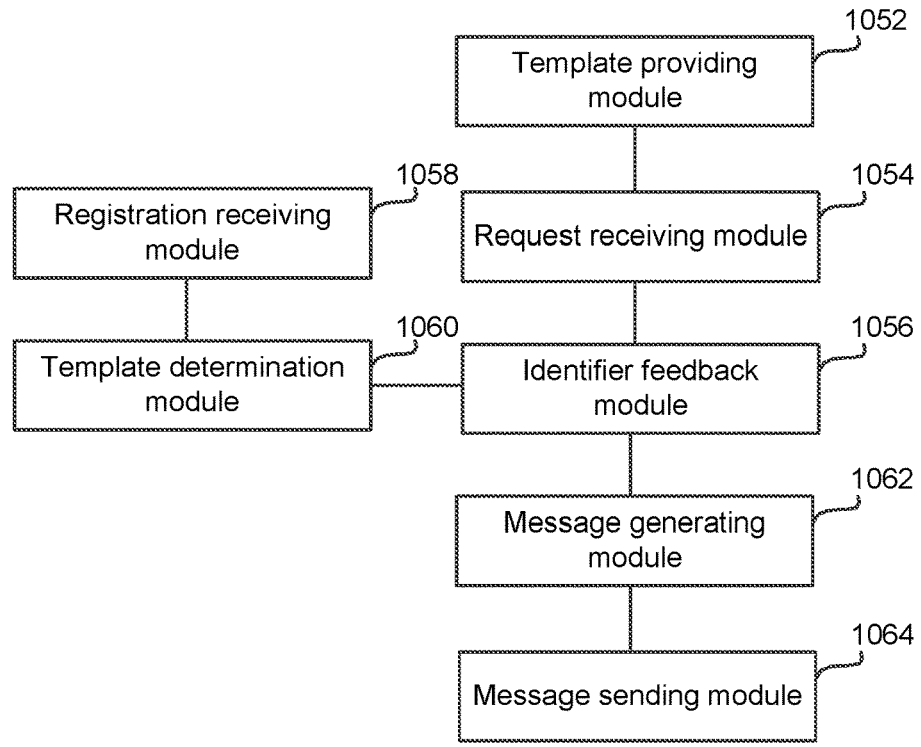
FIG. 10B is a block diagram of a template providing apparatus in accordance with some embodiments.

FIG. 10B is a block diagram of a template providing apparatus in accordance with some embodiments. For example, the template providing apparatus corresponds to communications module 224 (FIG. 2) of a server system 108 (FIGS. 1-2). In some embodiments, the template providing apparatus may be implemented in whole or in part on a server (e.g., server system 108, FIGS. 1-2) through software, hardware, or a combination thereof. In some embodiments, the template providing apparatus includes template providing module 1052, request receiving module 1054, and identifier feedback module 1056.

In some embodiments, template providing module 1052 is configured to provide one or more message templates to a public account. For example, template providing module 1052 provides the one or more message templates to the public account in response to a template request from the public account.

In some embodiments, template providing module 1052 includes: a request receiving unit, a template query unit, and a template feedback unit (not shown in FIG. 10B).

In some embodiments, request receiving unit is configured to receive a template request sent by the public client, where the template request includes categorical information. In some embodiments, the template query unit is configured to search a message template library for one or more message templates corresponding to the categorical information. In some embodiments, the template feedback unit is configured to provide the one or more identified message templates corresponding to the categorical information to the public account.

In some embodiments, request receiving module 1054 is configured to receive an identifier request sent by the public account.

In some embodiments, identifier feedback module 1056 is configured to provide a template identifier to the public account in response to receiving the identifier request. In some embodiments, the template identifier is used to invoke the server to send a message based on the corresponding message template.

In some embodiments, the template providing apparatus also includes registration receiving module 1058, template determination module 1060, message module 1062, and message sending module 1064.

In some embodiments, registration receiving module 1058 is configured to receive a template creation request to register a new message template created by the public account.

In some embodiments, template determination module 1060 is configured to determine whether the new message template satisfies predefined template registration criteria. In some embodiments, identifier feedback module 1056 is configured to generate a template identifier for the new message template and provide the template identifier to the public account in accordance with a determination by template determination module 1060 that the new message template satisfies the predefined template registration criteria.

In some embodiments, message generating module 1062 is configured to generate a message according to the template identifier and the one or more information parameters after receiving a message request from the public account with a template identifier for a message template, a target account (i.e., one or more recipient user accounts), and one or more information parameters.

In some embodiments, message sending module 1064 is configured to send the generated message to the target account.

It should be noted that, the template providing apparatus provided by the foregoing embodiment is an example of the division of the foregoing functions, and, in an actual application, the foregoing functions may be accomplished by different functional modules as required. That is, the structure of the template providing apparatus is divided into different functional modules, so as to accomplish all or a part of the functions in the foregoing description. In addition, the template providing apparatus provided by the foregoing embodiment belongs to a same concept as the embodiment of the template obtaining method, and for the specific implementation process, reference may be made to methods 750 and 800, which is not described herein again.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method controlling message dissemination from public accounts to private user accounts in a social networking platform, the method comprising:
   at a server operating the social networking platform that hosts a public account and a private user account that subscribes to the public account to exchange messages with the public account, the server having one or more processors and memory:
      receiving a template request from the public account in the social networking platform for a message template, the template request specifying one or more parameters associated with the message template and provided by the public account;
      in response to receiving the template request from the public account in the social networking platform:
         determining, among a plurality of service categories under which the public account is pre-registered, one or more service categories corresponding to the template request based on a user profile associated with the public account, wherein the user profile indicates an industry associated with the public account and services provided by the public account to the private user account;
         for each service category of the one or more determined service categories, identifying one or more template categories in accordance with the one or more parameters specified in the template request; and
         identifying, from a message template library of approved message templates, one or more message templates according to (1) the one or more determined service categories and (2) the one or more identified template categories within each determined service category;
      in accordance with a determination that the one or more message templates have been identified:
         sending the one or more identified message templates with corresponding template identifiers to the public account;
         after sending the one or more identified message templates to the public account, receiving a message request from the public account, the message request including a corresponding template identifier of a first message template, recipient information corresponding to the private user account that subscribes to the public account in the social networking platform, and respective values for one or more information parameters of the first message template;
         generating a message based on the message request and the first message template; and
         sending the generated message to the private user account in the social networking platform that corresponds to the recipient information.

2. The method of claim 1, further comprising:
   determining whether the first message template is one of the one or more message templates identified in accordance with the one or more determined service categories, wherein generation of the message based on the message request and the first message template is in accordance with a determination that the first message template is one of the one or more message templates identified in accordance with the one of the one or more determined service categories.

3. The method of claim 1, wherein the user profile of the public account includes one or more registered business categories of the public account, and wherein determining one or more categories corresponding to the template request based on the user profile specified in the template request further comprises:
   determining the one or more categories corresponding to the template request based on the one or more registered business categories of the public account.

4. The method of claim 1, wherein the user profile specified in the template request includes one or more template categories, and wherein the method further comprises:
   in accordance with a determination that the one or more template categories specified in the template request do not match any template categories in a set of approved template categories corresponding to a first business category under which the public account is registered, prompting the public account to initiate a message template creation process.

5. The method of claim 4, wherein the user profile of the public account is a first business category under which the public account is registered, and the method further includes:
after prompting the public account to initiate the message template creation process, receiving a new message template from the public account;
determining a respective template category for the new message template;
determining a second business category corresponding to the respective template category of the new message template, wherein the second business category is different from the first business category; and
determining whether to add the new message template to the new message template library and to associate the respective template category of the new message template with the first business category, based on a count of shared message templates between the second business category and the first business category.

6. The method of claim 1, wherein the first message template is a new message template created based on a modification to at least one of the one or more message template identified according to the one or more determined service categories, and
wherein the method further comprises:
determining whether to add to the new message template to the message template library based on the modification to the at least one message template.

7. A server, comprising:
one or more processors; and
memory storing one or more programs to be executed by the one or more processors, the one or more programs comprising instructions for:
at the server operating a social networking platform that hosts a public account and a private user account that subscribes to the public account to exchange messages with the public account:
receiving a template request from the public account in the social networking platform for a message template, the template request specifying one or more parameters associated with the message template and provided by the public account;
in response to receiving the template request from the public account in the social networking platform:
determining, among a plurality of service categories under which the public account is pre-registered, one or more service categories corresponding to the template request based on a user profile associated with the public account, wherein the user profile indicates an industry associated with the public account and services provided by the public account to the private user account;
for each service category of the one or more determined service categories, identifying one or more template categories in accordance with the one or more parameters specified in the template request; and
identifying, from a message template library of approved message templates, one or more message templates according to (1) the one or more determined service categories and (2) the one or more identified template categories within each determined service category;
in accordance with a determination that the one or more message templates have been identified:
sending the one or more identified message templates with corresponding template identifiers to the public account;
after sending the one or more identified message templates to the public account, receiving a message request from the public account, the message request including a corresponding template identifier of a first message template, recipient information corresponding to the private user account that subscribes to the public account in the social networking platform, and respective values for one or more information parameters of the first message template;
generating a message based on the message request and the first message template; and
sending the generated message to the private user account in the social networking platform that corresponds to the recipient information.

8. The server of claim 7, wherein the one or more programs further comprise instructions for:
determining whether the first message template is one of the one or more message templates identified in accordance with the one or more determined service categories, wherein generation of the message based on the message request and the first message template is in accordance with a determination that the first message template is one of the one or more message templates identified in accordance with the one of the one or more determined categories.

9. The server of claim 7, wherein the user profile of the public account includes one or more registered business categories of the public account, and wherein determining one or more categories corresponding to the template request based on the user profile specified in the template request further comprises:
determining the one or more categories corresponding to the template request based on the one or more registered business categories of the public account.

10. The server of claim 7, wherein the user profile specified in the template request includes one or more template categories, and wherein the one or more programs further comprise instructions for:
in accordance with a determination that the one or more template categories specified in the template request do not match any template categories in a set of approved template categories corresponding to a first business category under which the public account is registered, prompting the public account to initiate a message template creation process.

11. The server of claim 10, wherein the user profile of the public account is a first business category under which the public account is registered, and wherein the one or more programs further comprise instructions for:
after prompting the public account to initiate the message template creation process, receiving a new message template from the public account;
determining a respective template category for the new message template;
determining a second business category corresponding to the respective template category of the new message template, wherein the second business category is different from the first business category; and determining whether to add the new message template to the new message template library and to associate the respective template category of the new message template with the first business category, based on a count of shared message templates between the second business category and the first business category.

12. The server of claim 7, wherein the first message template is a new message template created based on a modification to at least one of the one or more message template identified according to the one or more determined service categories, and
wherein the one or more programs further comprise instructions for:
determining whether to add to the new message template to the message template library based on the modification to the at least one message template.

13. A non-transitory computer readable storage medium storing one or more programs, the one or more programs comprising instructions, which, when executed by a server with one or more processors, cause the server to perform operations comprising:
at a server operating a social networking platform that hosts a public account and a private user account that subscribes to the public account to exchange messages with the public account:
receiving a template request from the public account in the social networking platform for a message template, the template request specifying one or more parameters associated with the message template and provided by the public account;
in response to receiving the template request from the public account in the social networking platform:
determining, among a plurality of service categories under which the public account is pre-registered, one or more service categories corresponding to the template request based on a user profile associated with the public account, wherein the user profile indicates an industry associated with the public account and services provided by the public account to the private user account;
for each service category of the one or more determined service categories, identifying one or more template categories in accordance with the one or more parameters specified in the template request; and
identifying, from a message template library of approved message templates, one or more message templates according to (1) the one or more determined service categories and (2) the one or more identified template categories within each determined service category;
in accordance with a determination that the one or more message templates have been identified:
sending the one or more identified message templates with corresponding template identifiers to the public account;
after sending the one or more identified message templates to the public account, receiving a message request from the public account, the message request including a corresponding template identifier of a first message template, recipient information corresponding to the private user account that subscribes to the public account in the social networking platform, and respective values for one or more information parameters of the first message template;
generating a message based on the message request and the first message template; and
sending the generated message to the private user account in the social networking platform that corresponds to the recipient information.

14. The non-transitory computer readable storage medium of claim 13, wherein the instructions cause the server to perform operations further comprising:
determining whether the first message template is one of the one or more message templates identified in accordance with the one or more determined service categories, wherein generation of the message based on the message request and the first message template is in accordance with a determination that the first message template is one of the one or more message templates identified in accordance with the one of the one or more determined categories.

15. The non-transitory computer readable storage medium of claim 13, wherein the user profile of the public account includes one or more registered business categories of the public account, and wherein determining one or more categories corresponding to the template request based on the user profile specified in the template request further comprises:
determining the one or more categories corresponding to the template request based on the one or more registered business categories of the public account.

16. The non-transitory computer readable storage medium of claim 13, wherein the user profile specified in the template request includes one or more template categories, and
wherein the instructions cause the server to perform operations further comprising:
in accordance with a determination that the one or more template categories specified in the template request do not match any template categories in a set of approved template categories corresponding to a first business category under which the public account is registered, prompting the public account to initiate a message template creation process.

17. The non-transitory computer readable storage medium of claim 16, wherein the user profile of the public account is a first business category under which the public account is registered, and wherein the instructions cause the server to perform operations further comprising:
after prompting the public account to initiate the message template creation process, receiving a new message template from the public account;
determining a respective template category for the new message template;
determining a second business category corresponding to the respective template category of the new message template, wherein the second business category is different from the first business category; and
determining whether to add the new message template to the new message template library and to associate the respective template category of the new message template with the first business category, based on a count of shared message templates between the second business category and the first business category.

* * * * *